(12) United States Patent
Kawabe et al.

(10) Patent No.: US 12,220,883 B2
(45) Date of Patent: Feb. 11, 2025

(54) METHOD AND APPARATUS FOR MANUFACTURING A FORMED ARTICLE OF A COMPOSITE MATERIAL

(71) Applicant: FUKUI PREFECTURAL GOVERNMENT, Fukui (JP)

(72) Inventors: Kazumasa Kawabe, Fukui (JP); Shin Kaechi, Fukui (JP)

(73) Assignee: FUKUI PREFECTURAL GOVERNMENT, Fukui (JP)

( * ) Notice: Subject to any disclaimer, the term of this patent is extended or adjusted under 35 U.S.C. 154(b) by 431 days.

(21) Appl. No.: 17/630,770

(22) PCT Filed: Mar. 17, 2021

(86) PCT No.: PCT/JP2021/010740
§ 371 (c)(1),
(2) Date: Jan. 27, 2022

(87) PCT Pub. No.: WO2021/193268
PCT Pub. Date: Sep. 30, 2021

(65) Prior Publication Data
US 2022/0266546 A1 Aug. 25, 2022

(30) Foreign Application Priority Data
Mar. 26, 2020 (JP) .................................. 2020-055247

(51) Int. Cl.
*B29C 70/54* (2006.01)
*B29C 33/04* (2006.01)
(Continued)

(52) U.S. Cl.
CPC .............. *B29C 70/54* (2013.01); *B29C 33/04* (2013.01); *B29C 33/68* (2013.01); *B29C 70/345* (2013.01);
(Continued)

(58) Field of Classification Search
CPC .............. B29C 43/14; B29C 2043/144; B29C 2043/148; B29C 70/345; B29C 70/465; B29C 33/68
See application file for complete search history.

(56) References Cited

U.S. PATENT DOCUMENTS

| | | | | |
|---|---|---|---|---|
| 5,217,654 A | * | 6/1993 | Buckley | .................... C08J 3/243 |
| | | | | 264/294 |
| 10,322,530 B2 | * | 6/2019 | Kawabe | .................. B29C 43/20 |

(Continued)

FOREIGN PATENT DOCUMENTS

| | | | | |
|---|---|---|---|---|
| FR | 3076481 A1 | * | 7/2019 | ............ B29C 33/68 |
| JP | 7-290479 A | | 11/1995 | |

(Continued)

OTHER PUBLICATIONS

International Search Report for PCT/JP2021/010740 dated Apr. 20, 2021 (PCT/ISA/210).

*Primary Examiner* — Atul P. Khare
(74) *Attorney, Agent, or Firm* — Sughrue Mion, PLLC

(57) ABSTRACT

A method and apparatus for manufacturing a formed article of a composite material. The formed article is manufactured by heating and pressurizing a thermoplastic resin material and fabric material. The method includes a preforming process in which the material to be formed is put in a preforming mold with a release sheet arranged between the material and a part of the preforming mold. The material is heated and pressurized to impregnate the thermoplastic resin material into the fabric material, thus forming an impregnated intermediate material. Then, in a transport process the impregnated intermediate material in a heated state is taken out from the preforming mold with the release sheet left attached thereto, and transported. Finally there is a forming process in which the impregnated intermediate material is accommodated in the forming mold and the impregnated (Continued)

intermediate material is formed into the formed article of the composite material by pressurizing.

18 Claims, 12 Drawing Sheets

(51) Int. Cl.
    *B29C 33/68*     (2006.01)
    *B29C 70/34*     (2006.01)
    *B29C 70/42*     (2006.01)
    *B29C 70/46*     (2006.01)
    *B29C 43/14*     (2006.01)
    *B29C 43/52*     (2006.01)
    *B29K 101/12*     (2006.01)
    *B29K 105/06*     (2006.01)
    *B29K 105/08*     (2006.01)

(52) U.S. Cl.
    CPC .............. *B29C 70/42* (2013.01); *B29C 70/46* (2013.01); *B29C 70/465* (2013.01); *B29C 2043/144* (2013.01); *B29C 2043/527* (2013.01); *B29K 2101/12* (2013.01); *B29K 2105/0809* (2013.01); *B29K 2105/0872* (2013.01)

(56) References Cited

U.S. PATENT DOCUMENTS

| | | | | |
|---|---|---|---|---|
| 2009/0291278 | A1* | 11/2009 | Kawabe | ................ B29C 43/305 428/339 |
| 2012/0270009 | A1* | 10/2012 | Kawabe | ................... B32B 5/12 428/196 |
| 2021/0362443 | A1* | 11/2021 | Both | ..................... B29C 70/465 |

FOREIGN PATENT DOCUMENTS

| | | | | |
|---|---|---|---|---|
| JP | 2003181832 A | * | 7/2003 | ............ B29B 15/12 |
| JP | 2005059260 A | | 3/2005 | |
| JP | 2009-113369 A | | 5/2009 | |
| JP | 2011224968 A | * | 11/2011 | ............ B29C 43/14 |
| JP | 2016049649 A | * | 4/2016 | |
| JP | 2018-051795 A | | 4/2018 | |
| WO | WO-2019097969 A1 | * | 5/2019 | ............ B29C 33/38 |

\* cited by examiner

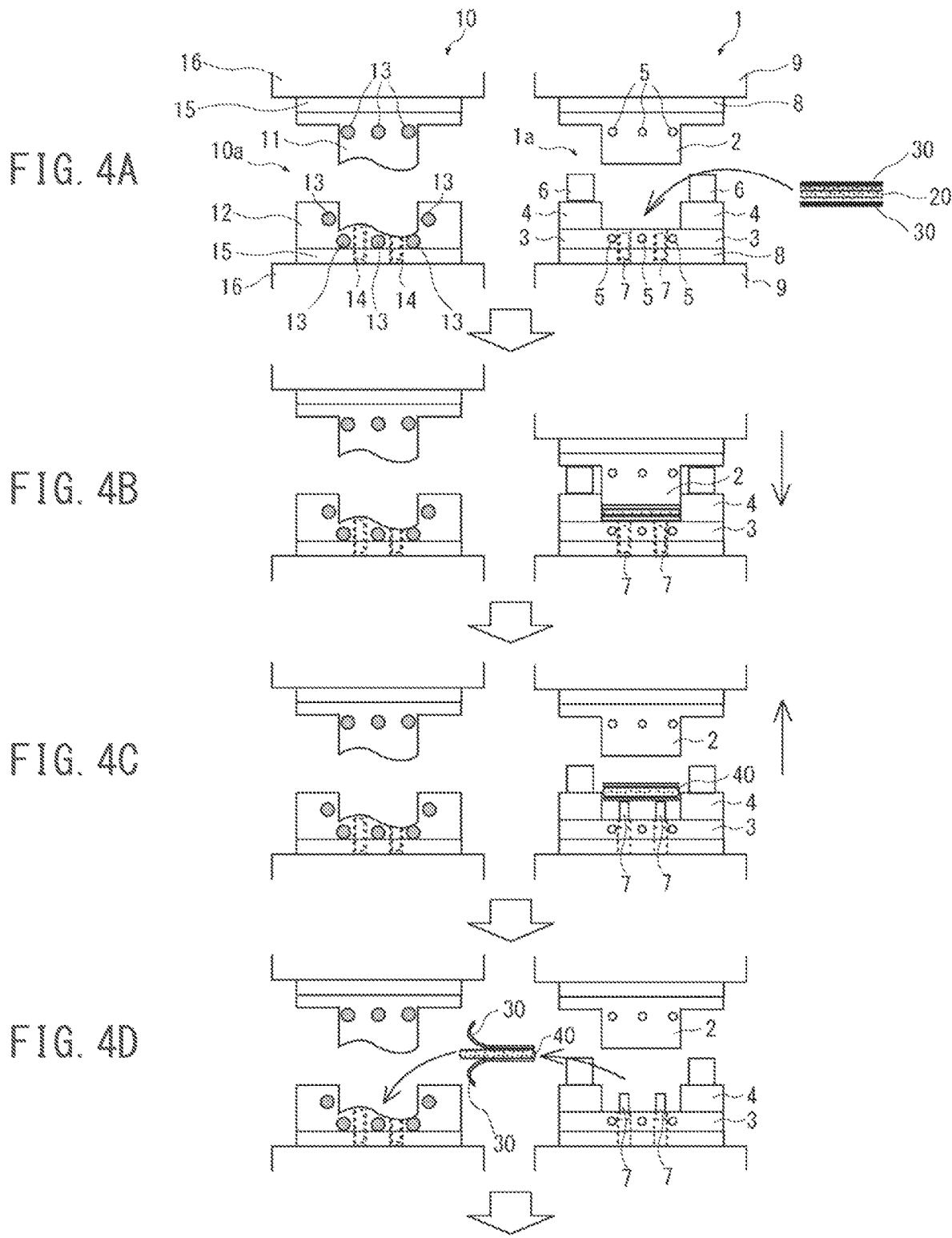

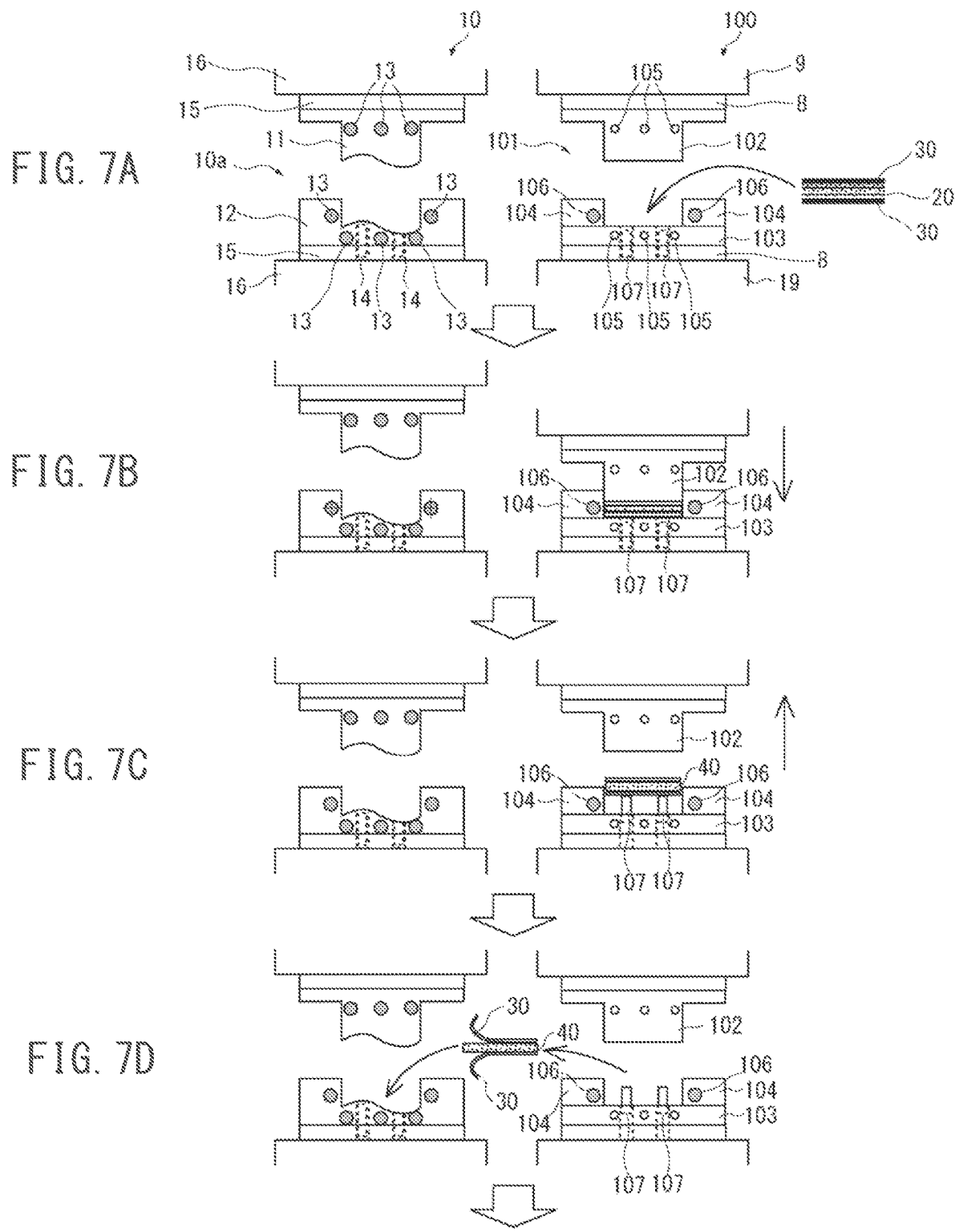

FIG. 10A
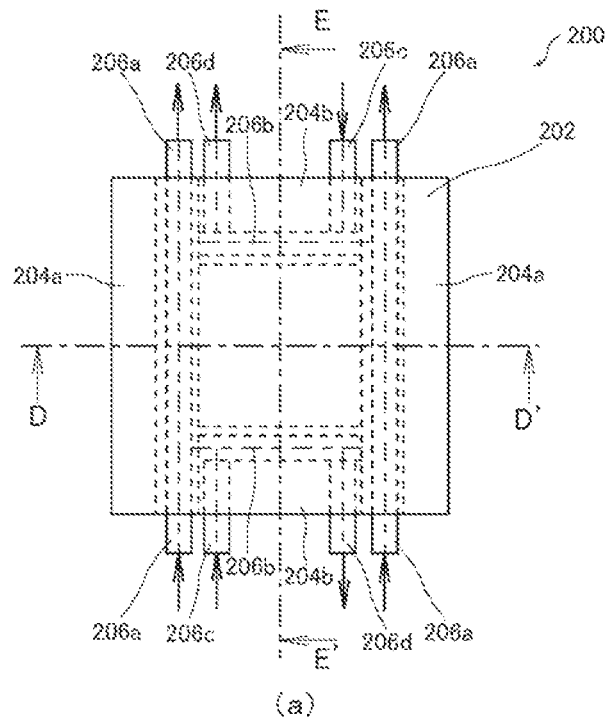
(a)
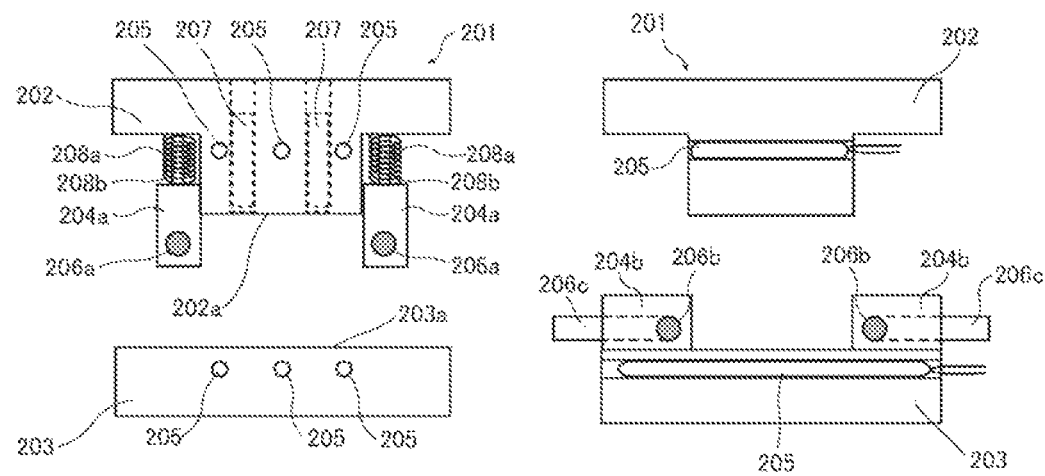
FIG. 10B          FIG. 10C

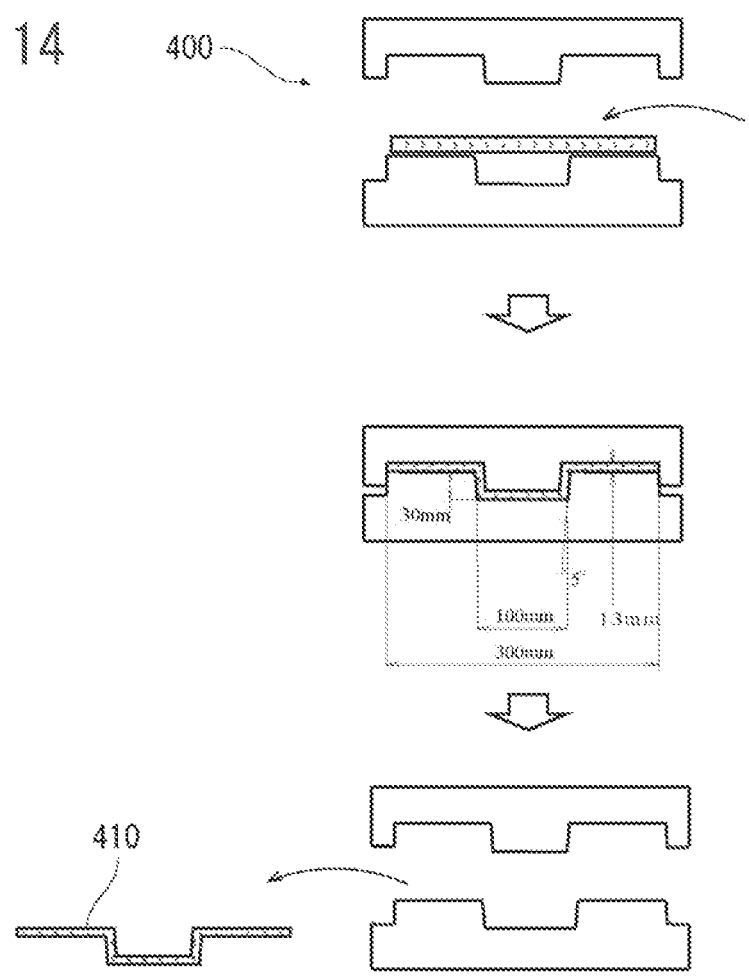

METHOD AND APPARATUS FOR MANUFACTURING A FORMED ARTICLE OF A COMPOSITE MATERIAL

CROSS REFERENCE TO RELATED APPLICATIONS

This application is a National Stage of International Application No. PCT/JP2021/010740 filed Mar. 17, 2021, claiming priority based on Japanese Patent Application No. 2020-055247 filed Mar. 26, 2020.

TECHNICAL FIELD

The present invention relates to a method and an apparatus for manufacturing a formed article of a fiber reinforced composite material by heating and pressurizing a material to be formed including a thermoplastic resin material and a fiber material.

BACKGROUND ART

The fiber reinforced composite material composed of the thermoplastic resin material and the fiber material has excellent properties such as light weight, high strength, and high modulus of elasticity, and has been used in a wide range of fields such as aircraft, automobiles, and sports-related goods. There have been known various methods for forming such composite material, among them, as a method for manufacturing small and medium-sized formed articles. Since various formed articles can be formed efficiently, a heat and pressure forming method has been used.

As the heat and pressure molding method, Heat & Cool forming method and the Stamping forming method may be given as examples.

In Heat & Cool forming method, as the materials to be formed, a laminated article or the like in which thermoplastic UD (unidirectional) prepreg sheets are laminated in any direction, or the laminated article in which a reinforced fiber fabric and a thermoplastic resin sheet are alternately laminated is used. Firstly, the material to be formed is introduced into forming mold and formed into a predetermined shape while melting the thermoplastic resin material by heating and pressurizing. Then, the forming mold is cooled and pressurized to solidify the thermoplastic resin, so that formed article is obtained. It is a forming method excellent in resin impregnation and moldability for making complicated shapes.

In the Stamping forming method, a laminated article in which the thermoplastic UD (unidirectional) prepreg sheets are laminated in any direction or the like is used as the material to be formed, and firstly, the thermoplastic resin material is heated and pressurized to form a plate shaped formed body (a platelike formed body) in which the thermoplastic resin material is impregnated into a fiber bundle. Then, the platelike formed body is heated in a heating furnace by infrared rays or the like to bring it into a molten state. Thereafter, the platelike formed body is introduced into the forming mold and a formed article having a predetermined shape is obtained by cooling while pressurizing it. The Stamping forming method is a method which enables to form the formed article of the composite material including a complicated shape as well in a short time.

It should be noted that, as the platelike formed body, such as one integrally formed in a plate shape in which reinforced fiber fabrics are laminated and impregnated with the thermoplastic resin material, or one integrally formed in a plate shape which may be obtained by heating and pressurizing the laminated body in which chopped tapes obtained by slitting the thermoplastic UD prepreg sheet into strips are randomly scattered and laminated may be used.

As for the method for obtaining a high quality thermoplastic formed article of composite material, methods described in e.g., Patent Documents 1 and 2 has been proposed.

In Patent Document 1, a method for forming is described, wherein the method comprises, arranging the material to be formed consisting of a reinforced fiber material and a thermoplastic resin material between a pair of forming molds, applying cooling and pressurizing treatments thereto, thereafter, placing the forming mold between a pair of cooling press molds, and applying cooling and pressurizing treatments to impregnate the thermoplastic material into the enforced fabric material and to form integrally.

Moreover, in Patent Document 2, a method for manufacturing a fabric reinforced thermoplastic resin formed body is described, wherein the method comprises, sealing inside a heat-resistant bagging material with a sealing material by wrapping the entire fiber reinforced thermoplastic resin before forming with heat-resistant bagging material consisting of a material having a melting point higher than the melting point of the thermoplastic resin, discharging air inside the heat-resistant bagging material containing the fiber reinforced thermoplastic resin therein to decompress the inside into a sub-vacuum state, placing the heat-resistant bagging material in a heated mold together with the fiber reinforced thermoplastic resin, preforming them after closing said mold, and cooling them after a predetermined time elapsed.

CITATION LIST

Patent Literature

Patent Document 1: Japanese Patent Laid-Open No. 2009-113369
Patent Document 2: Japanese Patent Laid-Open No. 2018-51795

SUMMARY OF INVENTION

Technical Problems

Heat & Cool forming method described above is a method in which a laminated article is set in a preheated mold and heating and pressurizing treatments are applied thereto at a required pressure for a required time. Thereafter, a rapid cooling treatment is applied at a required pressure, and a formed body is taken out when reached at a predetermined cooling temperature. Therefore, a high quality formed body can be obtained, it is necessary, however, to repeatedly heat and cool the mold, and deterioration of mold may easily progress. In addition, it is difficult to shorten the forming process time, and there are disadvantages such as high processing costs such as electricity bill, etc.

In the Stamping forming method described above, it is necessary to manufacture a platelike formed body. In a method for manufacturing the platelike formed body, for example, a laminated article is continuously supplied while applying continuously heating and pressurizing treatments and cooling and pressurizing treatments using a double belt device or the like to manufacture the platelike formed body impregnated with the thermoplastic resin material. With such manufacturing method, the platelike formed body can be produced in a short time, therefore it is a method having high productivity.

However, device cost of the double belt device is expensive. In addition, since the forming temperature is around 400° C., there are disadvantages that the cost burden such as electricity bill is large, severe belt wears due to high temperature heating is caused, and the manufacturing cost increases.

In addition, in order to improve impregnation of thermoplastic resin material into the fiber material, the heating temperature is increased to reduce the viscosity of the resin material, and the pressure applied during heating treatment is increased, however, in a state where there is no restriction and free for the side end of the laminated article to be continuously carried, melted resin material from the side end of the laminated article would be likely to flow out together with the fiber material, and there is a disadvantage that the fiber orientation and Vf (fiber volume content) values at the side end of the laminated article would became uneven and cause quality degradation.

In addition, as a method for manufacturing the platelike formed body, there is a method for manufacturing the platelike formed body using Heat & Cool method, in which the heating treatment is applied to a plurality of plate-like laminated articles which are stacked in the width direction while being sandwiched by release sheets. Even if it takes a long time for forming, there is an advantage that a unit price and treating time per sheet can be lowered by stacking the plurality of laminated articles and heating and pressurizing treatments are applied all at once. However, it takes time and effort to stack multiple sheets in the thickness direction while holding the laminated article between release sheets, if the number of sheets to be stacked is increased, required heating time would be made longer, and as a result, mass production would be difficult.

In addition, in the Stamping forming method, the platelike formed body is heated in the air by a device using such as far infrared rays, but there is a problem that deterioration due to heating may occur depending on types of thermoplastic resin material.

In a forming method described in Patent Document 1, it is necessary to manufacture a forming mold of a uniform thickness, and it is difficult to manufacture the forming mold corresponding to a formed article having a complicated shape such as a rising rib or boss, and there is a problem in forming the formed article of the composite material having a complicated shape. Moreover, in the cooling process, with respect to the end of the formed article, there is no restriction, which results in an uncontrollable state of the end of the formed article, the formed article cannot be finished in a predetermined shape, and there is a risk that the orientation disturbance of the reinforcing fiber would increase.

According to Patent Document 2, since the entire fiber reinforced thermoplastic resin is included with a heat-resistant bagging material, and placed in a mold and subjected to a heating and pressurizing forming, when forming a shape such as a rising rib or boss, or a shape having a curved surface that cannot be developed in a sheet shape, i.e., a shape having an non-developable surface, wrinkles, tear, and the like would be caused in the heat-resistant bagging material, which would results in a failure of forming.

From the above, it may be said that any method for forming the composite material composed of the thermoplastic resin material and the fiber material with high quality, in short time, and at low cost has not yet been established.

Accordingly, an object of the present invention is to provide a method and an apparatus for manufacturing a formed article of the composite material in which a material to be formed including a thermoplastic resin material and a fiber material can be formed into a high quality formed article of composite material by heating and pressurizing.

Solution to Problem

A method for manufacturing a formed article of a composite material according to the invention is a method for manufacturing a formed article of composite material in which the formed article of fiber-reinforced composite material is manufactured by heating and pressurizing a material to be formed including a thermoplastic resin material and a fabric material, which comprises, a preforming process in which said material to be formed is accommodated in said preforming mold with a release sheet being arranged between said material to be formed and a preforming mold, heated and pressurized to impregnate said thermoplastic resin material into said fabric material, and thereby preformed into an impregnated intermediate material, a transport process in which said impregnated intermediate material in a heated state is taken out from said preforming mold with said release sheet left attached thereto, and transported; and a forming process in which said impregnated intermediate material transported is accommodated in a forming mold in the heated state and formed into the formed article of the composite material by at least pressurizing.

An apparatus for manufacturing the formed article of the composite material according to the invention is the apparatus for manufacturing the formed article of the composite material in which a fiber-reinforced formed article of composite material is manufactured by heating and pressurizing the material to be formed including the thermoplastic resin material and the fabric material which comprises, a preforming part having a preforming mold which accommodates said material to be formed with a release sheet being arranged between said material to be formed and the preforming mold, and a preforming means which heats and pressurizes said preforming mold which accommodates said material to be formed to impregnate said thermoplastic resin material into said fabric material, so that said material to be formed is formed into an impregnated intermediate material, a transport part which takes out said impregnated intermediate material in a heated state from said preforming mold with said release sheet left attached thereto, and transports it, and a forming part having a forming mold which accommodates said transported impregnated intermediate material in the heated state, and a forming means which forms said impregnated intermediate material into the formed article of the composite material by at least pressurizing said forming mold which accommodates said impregnated intermediate material.

Advantageous Effects of Invention

According to the present invention, since the formed article of the composite material is formed while keeping the impregnated intermediate material in the heated state and the formed shape, after the impregnated material is preformed by heating and pressurizing the material to be formed including the thermoplastic resin material and the fabric material, the formed article of the composite material can be efficiently manufactured with high quality.

BRIEF DESCRIPTION OF DRAWINGS

FIG. 4A-4D are explanatory views of process related to preforming process.

FIG. 7A-7D are explanatory views regarding preforming process using the preforming mold as shown in FIG. 6.

FIG. 10A-10C are schematic views of preforming mold used in the process as shown in FIG. 8.

FIG. 14 are explanatory views of showing a forming process of Practical Example 3.

DESCRIPTION OF EMBODIMENTS

Hereinafter, embodiments according to the present invention will be described in detail. It should be noted that since embodiments described below are specific examples preferable for implementing the present invention, various technical limitations are made, the present invention is, however, not limited to these embodiments unless otherwise stated in the following description.

With a method for manufacturing a formed article of a composite material according to the present invention, a fiber reinforced formed article of composite material is manufactured by heating and pressurizing a material to be formed including a thermoplastic resin material and a fiber material. Specifically, the method for manufacturing the formed article of the composite material comprises, a preforming process in which the material to be formed is accommodated in preforming mold with a release sheet being arranged between the material to be formed and the preforming mold, heated and pressurized to impregnate the thermoplastic resin material into a fabric, and thereby preformed into an impregnated intermediate material, a transport process in which the impregnated intermediate material in a heated state is taken out from the preforming mold with the release sheet left attached thereto, and is transported, and a forming process in which the transported impregnated intermediate material accommodated in forming mold in heated state and the impregnated intermediate material is formed into the formed article of the composite material by pressurizing.

Figure 1:
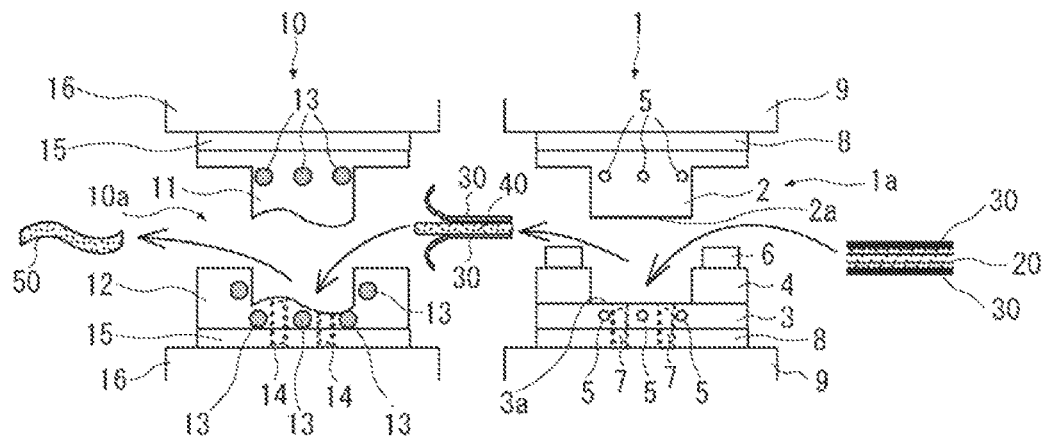
FIG. 1 is an explanatory view showing an example of the manufacturing process of a formed article of a composite material according to the present invention.

FIG. 1 is an explanatory view showing an example of a manufacturing process of the formed article of the composite material according to the present invention. In this example, there are provided a preforming part 1 for performing the preforming process and a forming part 10 for performing the forming process. The material to be formed 20 is accommodated in the preforming part 1 together with the release sheets 30, heated and pressurized in the preforming part 1, and preformed into the impregnated intermediate material 40. The impregnated intermediate material 40 is taken out from the preforming part 1 in a heated state with the release sheets 30 left attached thereto and transported. The release sheets 30 are peeled off from the transported impregnated intermediate material 40, then the transported impregnated intermediate material 40 is accommodated in the forming part 10 while keeping a formed shape and the heated state and cooled and pressurized in the forming part 10 to form the formed article of the composite material 50.

Figure 2A:
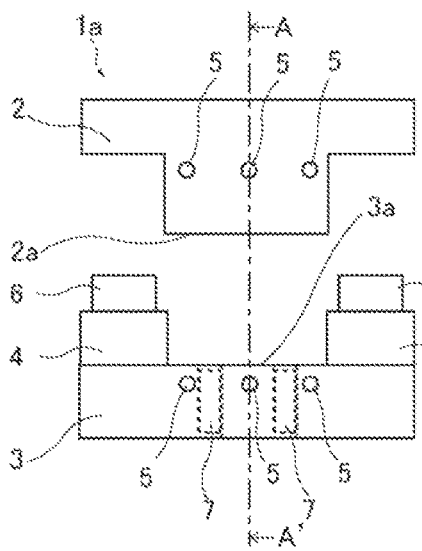
FIG. 2A-2B are explanatory views of preforming mold.
Figure 2B:
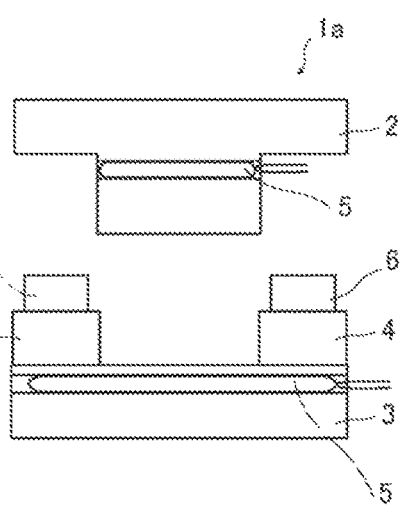

FIG. 2A-2B are explanatory views of the preforming mold 1a placed in the preforming part 1, and FIG. 2A is a schematic cross-sectional view of the preforming mold 1a, and FIG. 2B is a cross-sectional view along A-A' of FIG. 2A. The preforming mold 1a has an upper preforming mold 2, a lower preforming mold 3, and a side end preforming mold 4. The upper preforming mold 2 and the lower preforming mold 3 are arranged opposite to each other, and there is formed a preforming region for preforming between an upper surface portion for the preforming 2a which is the lower surface of the upper preforming mold 2, and a lower surface portion for preforming 3a which is the upper surface of the lower preforming mold 3. The side end preforming mold 4 is for treating an outflow of molten thermoplastic resin material from a portion where the release sheet is not arranged, and in this example, it is arranged such that it surrounds a preforming region on the upper surface of the lower preforming mold 3. While the side end preforming mold 4 can be also integrated with the lower preforming mold 3, as described later, separated arrangement of side end preforming mold 4 and the lower preforming mold 3 would enable to suppress a flow of the thermoplastic resin material at the peripheral portion of the impregnated intermediate material 40 arranged opposite to the side end preforming mold 4, so that the quality can be improved.

The upper preforming mold 2 and the lower preforming mold 3 have a plurality of built-in heating rods 5 along the preforming region, and the preforming region can be heated to a predetermined temperature by controlling heating of the heating rods 5. Ejector pins 7 are inserted in the lower preforming mold 3 to be movable in and out in the vertical direction. A gap adjustment jig 6 is disposed on the upper surface of the side end preforming mold 4.

The upper part of the upper preforming mold 2 and the lower part of the preforming mold 3 are each fixedly supported by a press device 9 through the insulation material 8. The preforming region is pressurized by operating the press device 9 to relatively move the upper preforming mold 2 toward the lower preforming mold 3. In this example, as a preforming means, there are provided a device for applying heat treatment by the heating rods 5 and a device for applying pressurization treatment by the press device 9.

The forming part 10 that performs the forming process has an upper forming mold 11 and a lower forming mold 12 as a forming mold 10a. The upper forming mold 11 and the lower forming mold 12 are arranged opposite to each other, so that a forming region is formed between the upper forming mold 11 and the lower forming mold 12. Inside the upper forming mold 11 and the lower forming mold 12, a plurality of cooling pipes 13 are provided along the forming region, and the forming region is cooled by circulating a cooling medium in the cooling pipes 13. The ejector pins 14 are inserted in the lower forming mold 12 to be movable in and out in the vertical direction.

The upper part of the upper forming mold 11 and the lower part of the lower forming mold 12 are each fixedly supported by a press device 16 through the insulation material 15. The forming region is pressurized by operating the press device 16 to relatively move the upper forming mold 11 toward the lower forming mold 12. In this example, as a forming means, there are provided devices for applying the cooling treatment by the cooling pipes 13 and for applying the pressurizing treatment by the press device 16.

The transport part (not shown) for performing the transport process is arranged between the preforming part 1 and the forming part 10, so that the impregnated intermediate material 40 taken out of the preforming mold 1a in a heated state is transported with the release sheets 30 left contacted therewith. As the transport part, any known transport means such as a carrying conveyor or actuator can be used.

Figure 3:
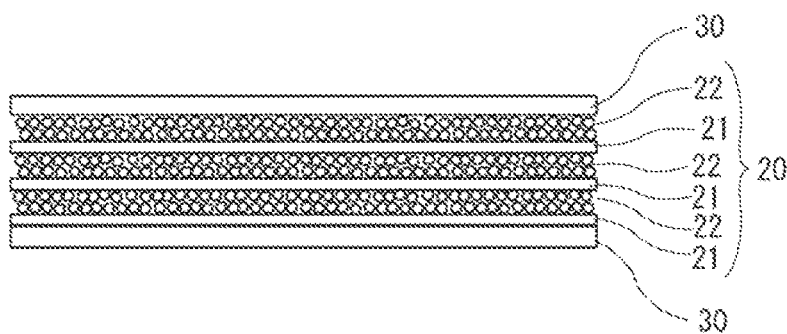
FIG. 3 is a side view showing materials to be formed and release sheets in laminated state.

The material to be formed 20 is accommodated in the preforming region in the preforming part 1 while keeping both surfaces being in contact with the release sheets 30. The material to be formed 20 is accommodated in a state that the release sheets 30 are arranged between the material to be formed 20 and the preforming mold 1a. FIG. 3 is a side view showing the material to be formed 20 and the release sheets 30 in a laminated state. In this example, the material to be formed 20 is formed by alternately laminating a sheet fiber material 21 and a sheet thermoplastic resin material 22, on both surfaces of which release sheets 30 are arranged.

As the material to be formed, one in which at least the thermoplastic resin material and the fiber material are included may be used. As thermoplastic resin material, polypropylene, polyethylene, polystyrene, polyamide (nylon 6, nylon 66, nylon 12, etc.), polyacetal, polycarbonate, acrylonitrile-butanolone-styrene copolymer (ABS), polyethylene terephthalate, polybutylene terephthalate, polyetherimide, polyether sulfone, polyphenylene sulfide, polyether ketone, polyether ether ketone and the like may be given as examples. Further, two or more of these thermoplastic resins may be mixed and used as polymer alloys. Thermoplastic resin material may be in any form such as liquid, powdery, granular, fibrous, fabric, or sheet and is not particularly limited thereto.

The fiber material is a material in which a plurality of reinforcing fibers are bundled such as high-strength, high elastic modulus inorganic fibers and organic fibers used for FRP, e.g. carbon fiber, glass fiber, ceramic fiber, aramid fiber, polyoxymethylene fiber, aromatic-polyamide fiber, PBO (poly-p-phenylenebenzobisoxazole) fibers, metal fibers, and the like. Further, a plurality of various fiber bundles may be combined. It should be noted that the fineness is not particularly limited.

As a form of the material to be formed, using the thermoplastic UD (Unidirectional) prepreg sheet in which the thermoplastic resin material is impregnated into a plurality of fiber materials arranged in one direction, a form of a laminated article in which thermoplastic UD prepreg sheets are laminated in any direction may be given as an example. Also, as the fiber material, using the fiber material in the form of woven fabric, a form of laminated article in which the fabric and thermoplastic resin sheet are alternately laminated may be allowable. Furthermore, a form of sheet-like laminated article in which chopped tapes obtained by slitting the thermoplastic UD prepreg sheet into strips are randomly scattered and laminated may be also allowable. Furthermore, a form of nonwoven fabric consisting of the fiber material and a fibrous thermoplastic resin material may be allowable.

One integrally formed by dot-welding using, for example, a bar heater etc. can be used to maintain the laminated state of the laminated article.

As the thermoplastic UD prepreg sheet, a prepreg sheet in which thermoplastic resin material is impregnated into the fiber material without almost no void would be also allowable, the semi-prepreg sheet in which the thermoplastic resin material is unevenly distributed between fiber arrangement layers and the thermoplastic resin material is semi-impregnated into the fiber material would be also allowable.

As the release sheet, a resin sheet having heat resistance and release properties or one in which a release agent is applied to the surface of a metal sheet may be given as examples. Since a material of the release sheet is heated to the melting temperature of the thermoplastic resin material, it is preferable to select a material that can maintain the form of the release sheet at the heating temperature. For example, when using PP (polypropylene) resin, PA6 (polyamide 6) resin, or the like as the thermoplastic resin material, since the heating temperature is in the range of 200° C. to 260° C., it is preferable to select a fluorine resin sheet as the release sheet. when using PPS (polyphenylene sulfide) resin, PEEK (polyetheretherketone) resin, or the like as a thermoplastic resin material, since the heating temperature is in the range of 300° C. to 400° C., it is preferable to select a thermosetting PI (polyimide) resin sheet as the release sheet.

When a metal sheet is selected as the release sheet, though it has sufficient heat resistance, it is necessary to select a material whose release agent to be applied to the surface has durability against the heating temperature in the preforming process.

It should be noted that the release sheet in contact with the impregnated intermediate material is preferably to be flexible. When peeling off the release sheet from the impregnated intermediate material, by gradually peeling off the release sheet from the end, the release sheet can be peeled off smoothly without breaking the formed shape of impregnated intermediate material and without causing wrinkles or creases.

FIG. 4A-4D are explanatory views of a process related to the preforming process. FIG. 5 are explanatory views of a process related to the forming process. In the preforming process, the material to be formed 20 is accommodated in the preforming mold 1a with the release sheets 30 left adhered to both sides thereof (FIG. 4A). The material to be formed 20 is accommodated with the release sheets 30 arranged between the upper preforming mold 2 and the lower preforming mold 3. The preforming mold 1a can efficiently perform the preforming by setting it in a heated state at the melting temperature or above of the thermoplastic resin material in advance.

Next, the upper preforming mold 2 and the lower preforming mold 3 are set to be clamped and to a pressurized state (FIG. 4B). Then, a pressurizing treatment is applied in a state that the thermoplastic resin material is melted by heat conduction of the upper preforming mold 2 and the lower preforming mold 3. By applying the pressurizing treatment, the thermoplastic resin material 20 is impregnated into the fiber material, which results in a formation of an integrated impregnated intermediate material 40. After forming the impregnated intermediate material 40, the upper preforming mold 2 and the lower preforming mold 3 are opened, and the impregnation intermediate material 40 being in the heated state is lifted by the ejector pins 7 while keeping contact with the release sheets 30 and separated from the lower preforming mold 3 (FIG. 4C). The impregnated intermediate material 40 is taken out, from which the release sheets 30 adhered to both sides thereof are peeled off and transported to the forming part 10 while keeping the heated state and the formed shape, (FIG. 4D).

When the formed impregnated intermediate material 40 is taken out from the preforming part 1, since the release sheets 30 are arranged between the upper preforming mold 2 and the lower preforming mold 3, it is possible to take out the impregnated intermediate material 40 being in a heated state without adhering to the upper preforming mold 2 and the lower preforming mold 3. Though the impregnated intermediate material 40 has adhesiveness because the thermoplastic resin material becomes melted or softened in the heated state, it can be taken out while keeping the formed shape without adhering to the upper preforming mold 2 and the lower preforming mold 3 owing to the release sheets 30.

In the preforming process, it is preferable to set an area of a processing region where the material to be formed is heated and pressurized to be smaller than an area of a working region for heating and pressurizing the preforming mold 1a. In the above-described example, the areas of the upper and lower surfaces of the material to be formed 20 which are heated and pressurized are set to be smaller than an area of working region of the preforming area where the heating and the pressurization are performed, the working region being defined by the upper preforming mold 2, the lower preforming mold 3, and the side end preforming mold 4. By setting in this way, the material to be formed can be smoothly accommodated, and when it is heated and pressurized, the flow of the thermoplastic resin material occurs which would make it easy to penetrate in the fiber material and possible to reduce generation of voids in the impregnated intermediate material.

Figure 5A:
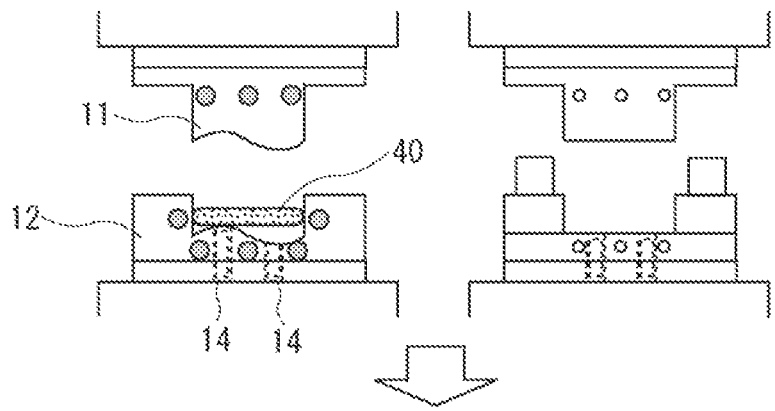
FIG. 5A-5D are explanatory views of process related to forming process.
Figure 5B:
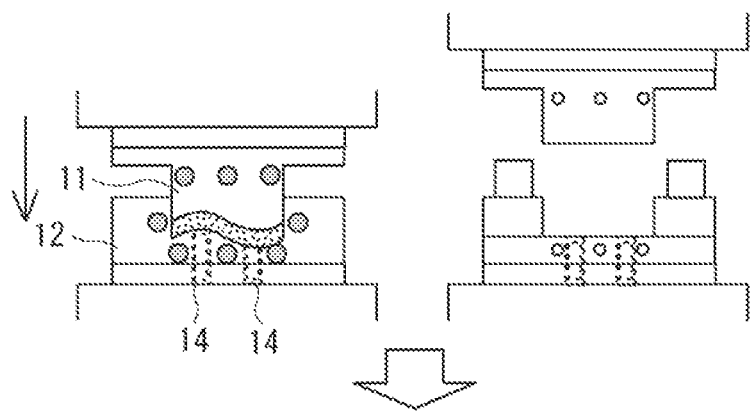
Figure 5C:
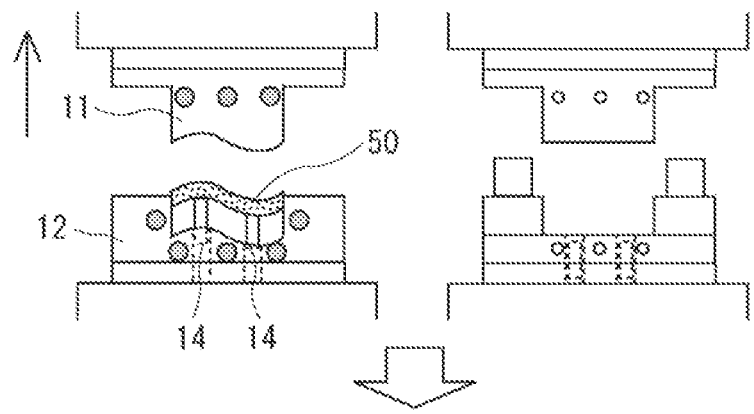
Figure 5D:
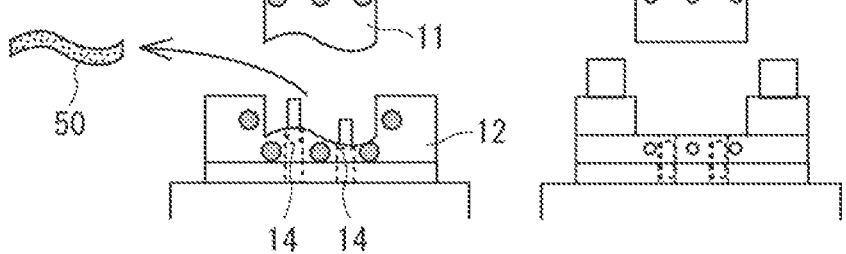

In the forming process, the impregnated intermediate material 40 which is in the formed shape in a heated state is accommodated in the forming mold 10a (FIG. 5A). Then, the upper forming mold 11 and the lower forming mold 12 are closed and set to a pressurized state (FIG. 5B). At this time, the upper forming mold 11 and the lower forming mold 12 are set to the temperature at which the thermoplastic resin material solidifies or below. Therefore, the impregnation intermediate material 40 solidifies and is formed into the formed article of the composite material 50. After forming the formed article of the composite material 50, the upper forming mold 11 and the lower forming mold 12 are opened, and the formed article of the composite material 50 is lifted by the ejector pins 14 to separate from the lower forming mold 12 (FIG. 5C). Then, the formed article of the composite material 50 is taken out (FIG. 5D). Since the preformed impregnated intermediate material in heated state is formed in this way, the formed article of the composite material with high quality can be efficiently manufactured.

In the forming process, it is preferable to set an area of treating region where the impregnated intermediate material is pressurized to be smaller than the area of working region where the forming mold 10a is pressurized. In the above-described example, an area where the upper and lower surfaces of the impregnated intermediate material 40 are pressurized is set to be smaller than an area of the working region for the pressurization in the forming region defined by the upper forming mold 11 and the lower forming mold 12. By setting in this way, smooth accommodating operation of the impregnated intermediate material can be obtained, the impregnated intermediate material may flow when pressurized, and the formed article with a high shape accuracy and reduced void can be obtained.

In the explanatory views of the process of FIGS. 4 to 5, while a series of the manufacturing processes of the material to be formed are described, the material to be formed can be processed by introducing the material to be formed sequentially into the preforming part 1, and the material to be formed can be continuously formed. In other words, immediately after the impregnated intermediate material 40 that is preformed in the preforming part 1 is transported to the forming part 10, a following material to be formed 20 is introduced into the preformed part 1, so that a continuous forming process becomes possible. In such continuous process, the forming process time is rate-limited to the time required for the preforming process or forming process. For example, when it takes 1 minute for the preforming process, 10 seconds for the transport process, and 1 minute for the forming process as a processing time of one piece, one formed article of composite material can be manufactured in about 1 minute and 10 seconds. Further, as the process time of one sheet, when it takes 1 minute for the preforming process, 10 seconds for the transport process, and 3 minutes for the forming process, one formed article of composite material can be manufactured in about 3 minutes and 10 seconds.

The impregnated intermediate material formed in the preforming process is preferably formed into a developable surface shape. The developable surface shape is a shape that can be developed to a plate surface without expansion or contraction, and a planar shape, that is, a flat plate shape, or a shape that can be developed into a plane by bending or cutting may be given as examples.

For example, when it is the flat plate shape, the uneven expansion/contraction deformation and shear deformation due to pressurization deformation can be prevented by pressurizing the top and bottom surfaces of the flat plate shape in the thickness direction using the upper preforming mold 2 and the lower preforming mold 3 in the preforming process. Therefore, occurrence of uneven portion such as turbulence of the fiber material can be prevented as much as possible in the impregnated intermediate material. Further, when the release sheets 30 are arranged at least on both sides of the upper surface and the lower surface of the flat plate shape, since the flat plate shape is a developable surface shape, wrinkles and tears are less likely to occur in the release sheet during pressurization deformation. With this effect, a high quality impregnated intermediate material is formed and advantage of repeatedly useable of the release sheet is obtained.

In the above-described example, in the preforming process, the release sheets 30 are arranged on the upper and lower surfaces of the material to be formed 20, and the release sheet 30 is not disposed on the peripheral end surface other than the upper and lower surfaces. Therefore, molten thermoplastic resin material would flow out of the peripheral portion of the formed material 20, which could cause the quality deterioration such as disturbance of the fiber material at the peripheral portion, and adhesion to the side end preforming mold 4. Therefore, in the preforming process, the peripheral portion of the impregnated intermediate material is treated by these pressurization operations so that the thermoplastic resin material does not unnecessarily flow out to the peripheral portion.

As for the method for treating the periphery of impregnated intermediate material, the pressurizing of the preforming mold is continued until the shape thickness in the pressurization direction of the impregnated intermediate material becomes a set thickness, and the pressurizing of the preforming mold is stopped after the shape thickness becomes the set thickness.

Here, the set thickness is the thickness of the impregnated intermediate material in which the thermoplastic resin material is impregnated into the fiber material and integrated therewith, and the set thickness is preferably the thickness in the impregnated state without voids.

when the impregnated intermediate material is formed into a plate shape of a fixed thickness, the thickness t(mm) of the impregnated intermediate material when the thermoplastic resin material is impregnated into the fabric material without void and formed can be obtained from the following formula, using weight Wm(g) of the material to be accommodated in the preforming mold, density $\rho m(g/cm^3)$ of the impregnated intermediate material when formed without voids, and an area $Am(cm^2)$ of the impregnated intermediate material to be formed.

$$t = (Wm/\rho m)/A$$

Here, the density $\rho m$ $(g/cm^3)$ of the impregnated intermediate material when formed without voids can be obtained from the forming material to be formed as follows. When the material to be formed consists only of the fiber material and the thermoplastic resin material, and where the density of the fiber material is $\rho c(g/cm^3)$, the weight par unit of the fiber material is Wc $(g/m^2)$, the density of thermoplastic resin material is $\rho r(g/cm^3)$ and the weight par unit of the thermoplastic resin material is $Wr(g/m^2)$, the density $\rho m(g/m^3)$ of the impregnated intermediate material is obtained by the following formula.

$$\rho m = (Wc + Wr)/\{(Wc/\rho c) + (Wr/\rho r)\}$$

In the above-described example, the set thickness is set using the gap adjustment jig 6 as a gap adjustment part for adjusting the gap between the upper preforming mold 2 and the lower preforming mold 3. The gap adjustment jig 6 corresponding to the set thickness is set between the upper preforming mold 2 and the side end preforming mold 4 of the preforming part 1. When the preforming part 1 is clamped at a set pressure, a gap is generated between the upper preforming mold 2 and the side end preforming mold 4 by the gap adjustment jig 6. Therefore, the gap between the upper preforming mold 2 and the lower preforming mold 3 is adjusted, the material to be formed is continued to be pressurized until the set thickness is obtained and is thereby reliably preformed to the impregnated intermediate material of the set thickness. In addition, when it becomes a state of being formed at the set thickness, the set pressure due to the clamping is applied to the gap adjustment jig 6, and the pressurization operation to the impregnated intermediate material is stopped. The impregnated intermediate material is no longer pressurized, and the flow of thermoplastic resin material to the peripheral portion is suppressed.

Therefore, it becomes possible that the thermoplastic resin material and the fiber material in the vicinity of the peripheral portion can be suppressed from flowing out of the peripheral portion of the impregnated intermediate material and from adhering to and pressing the side end preforming mold 4. When thermoplastic resin material and fiber material at the peripheral portion flow out and become to be adhered to the side end preforming mold 4 and to press it, the impregnated intermediate material becomes to be in pressure-contact with the side end preforming mold 4 and thereby to press thereon, so that it becomes difficult to take out the impregnated intermediate material from within the preforming mold 1. It should be noted that, since the side end preforming mold 4 is arranged separately from the lower preforming mold 3, the thermoplastic resin material and the fabric material which flow out of the periphery of the material to be formed 20 can also be prevented from adhering to the side end preforming mold 4 by finely adjusting the arrangement of the side end forming mold 4. Further, the gap adjustment jig 6 may be also attached at a position of the upper preforming mold 2 opposite to the side end preforming mold 4.

As for a method for treating the peripheral portion of the impregnated intermediate material, in the preforming process, when the thermoplastic resin material is impregnated into the fiber material by heating and pressurizing the material to be formed, the impregnated intermediate material can be preformed while cooling at least a portion where the release sheet of the formed material is not arranged.

Figure 6A:
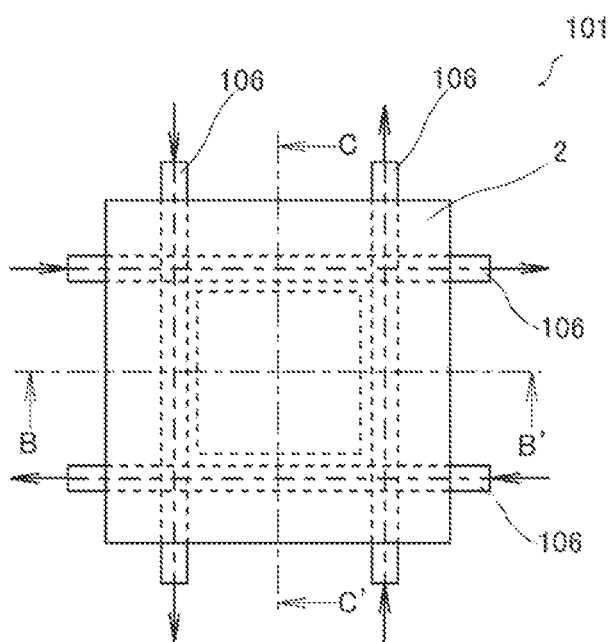
FIG. 6A-6C are explanatory views of preforming mold provided with a cooling part.
Figure 6B:
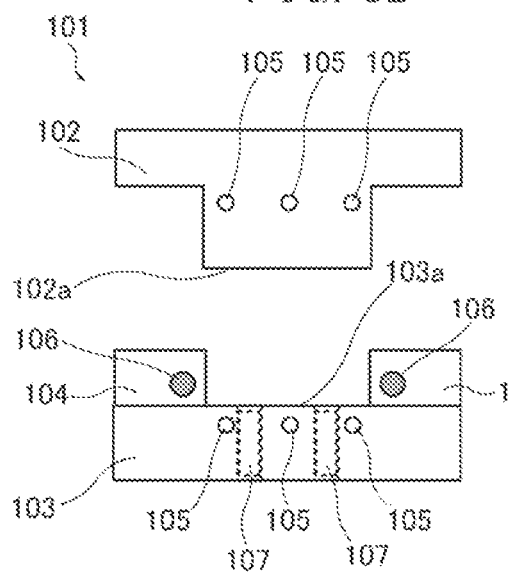
Figure 6C:
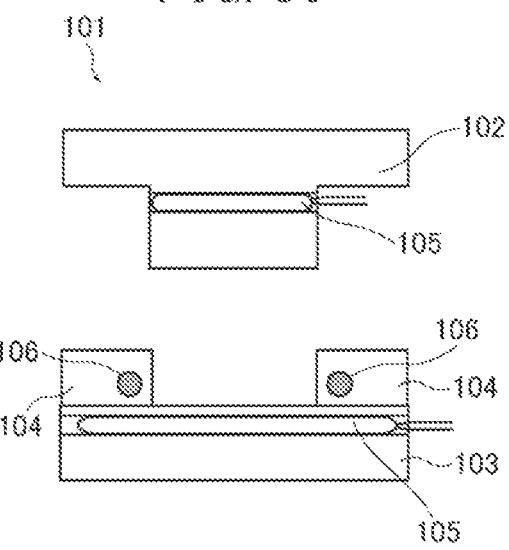
Figure 8A:
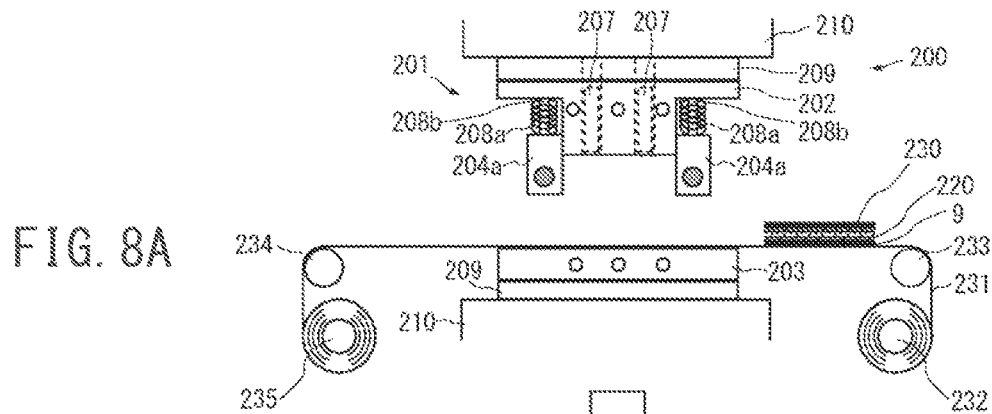
FIG. 8A-8D are explanatory views of process in which an impregnated intermediate material is transported using a release sheet.
Figure 8B:
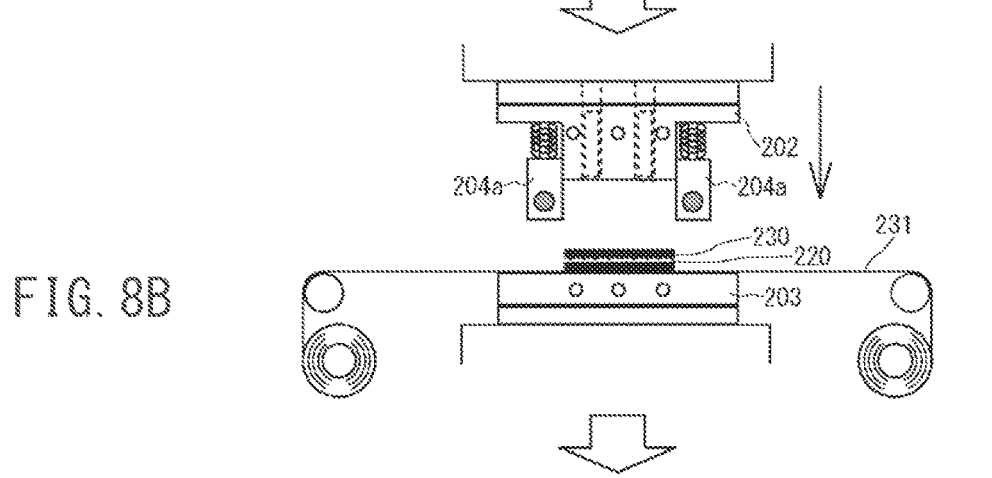
Figure 8C:
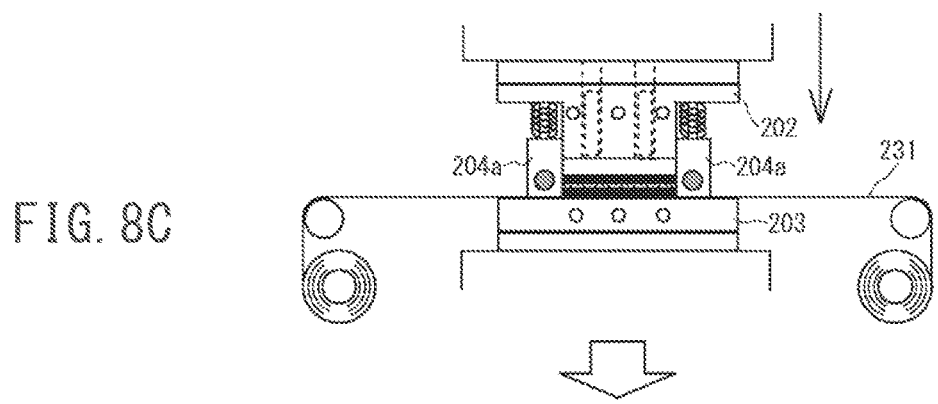
Figure 8D:
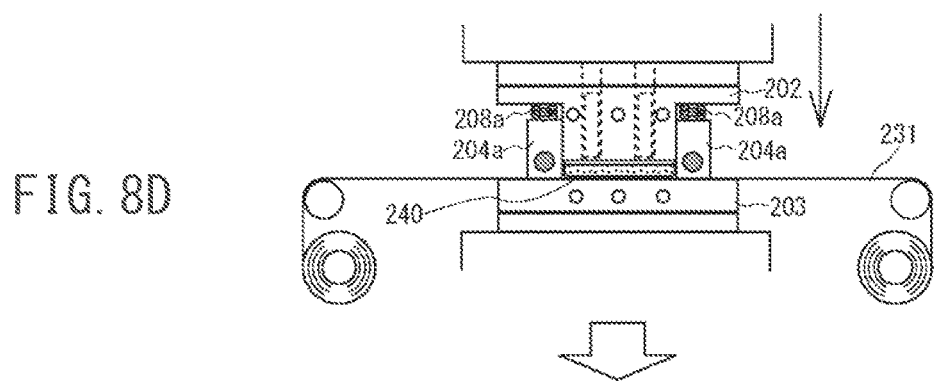

FIG. 6A-6C are explanatory views of preforming mold 101 provided with a cooling part. FIG. 6A is a plain view, FIG. 6B is a cross-sectional view along B-B' of FIG. 6A, and FIG. 6C is a cross-sectional view along C-C' of FIG. 6A. In this example, the forming part 100 comprises the upper preforming mold 102 and the lower preforming mold 103 as the preforming mold 101, as with the preforming mold 1a shown in FIG. 2. On the upper surface 103a of the lower preforming mold 103, the side end preforming mold 104 is arranged so that it surrounds the preforming region. Heating rods 105 are inserted into the upper preforming mold 102 and the lower preforming mold 103, and whole of the preforming mold 101 can be heated by heating the heating rods 105. Further, ejector pins 107 are inserted into the lower preforming mold 103, and the impregnated intermediate material can be lifted and taken out by moving the ejector pins 107 up and down. Such configuration is the same as the preforming part 1.

The side end preforming mold 104 has cooling pipes 106 therein, and four cooling pipes 106 are provided along the four sides of the side end preforming mold 104 arranged in a rectangular shape. The coolant such as water or oil is distributed through the cooling pipes 106 to cool the side end preforming mold 104. The cooling temperature is necessary to be at least the melting temperature or below of the thermoplastic resin material, the cooling temperature is set so that an outflow from the peripheral portion where the release sheet is not arranged and orientation disturbances of the fiber material accompanying therewith can be prevented, when the material to be formed is heated and pressurized.

FIG. 7A-7D are explanatory views regarding the preforming process using the preforming mold as shown in FIG. 6. As for the forming process, since the forming process is the same as the process described with reference to FIG. 5, description is omitted.

In the preforming process, the material to be formed 20 is accommodated in the preforming mold 101 placed in the preforming part 100 while keeping the released sheets 30 in contact with both surfaces thereof (FIG. 7A). The formed material 20 is accommodated with the release sheets 30 arranged between the upper preforming mold 2 and the lower preforming mold 3. In the preforming part 100, by setting the preforming mold 101 in a preheated state at the melting temperature or above of the thermoplastic resin material, the preforming can be performed efficiently. Still more, it is preferable to cool the side end preforming mold 104 which is in contact with at least the peripheral portion of the material to be formed 20 where the release sheet 30 is not arranged to become to the melting temperature or below.

Next, the upper preforming mold 102 and the lower preforming mold 103 are closed and set to a pressurizing state (FIG. 7B). Then, by applying pressurizing treatment to the material to be formed 20 in a state that the thermoplastic resin material is melted by the conductive heat of the upper preforming mold 102 and the preforming part 103, the material to be formed is formed into an integrally configured impregnated intermediate material 40 in which thermoplastic resin material is impregnated into the fabric. At that time, the peripheral portion of the impregnated intermediate material 40 is cooled by the side end preforming mold 104, so that the outflow of the thermoplastic resin material and the orientation disturbance of the fiber material accompanying therewith can be prevented.

After forming the impregnated intermediate material 40, the upper preforming mold 102 and the lower preforming mold 103 are opened, and the impregnated intermediate material 40 in a heated state is lifted by the ejector pins 107 to separate from the lower preforming mold 103 (FIG. 7C). At that time, since the peripheral portion of the impregnated intermediate material 40 is cooled, it can be smoothly removed without adhering to the side end preforming mold 104. The impregnated intermediate material 40 is taken out, then the release sheets 30 adhered to both sides are gradually peeled off from the end like turning, and the impregnated intermediate material 40 is transported to the forming part 10 while being kept in the heated state and the formed shape (FIG. 7D).

As described above, by performing the peripheral treatments, including such method as to stop the pressurization at the set thickness against the impregnated intermediate material, or cooling at least the portion where the release sheet is not arranged, the impregnated intermediate material can be smoothly taken out while preventing the adhesion of the resin material and keeping its formed shape and heated state, even if the release sheets are arranged on the pressurized surfaces and not arranged on other non-pressurized surfaces of the impregnated intermediate material. Therefore, it has become possible to realize to perform a forming cycle in a short time.

As for such method of the peripheral treatment, any treatment may be employed other than the treatments of stopping pressurization at the set thickness as mentioned above and cooling the portion where the release sheet is not arranged. These treatments may be performed in combination and are not particularly limited thereto.

As described above, when the impregnated intermediate material is formed into a platelike shape, the release sheet can be arranged on surfaces on both sides which are to be in contact with the upper forming mold and the lower forming mold, the release sheet can be omitted on the side surface, i.e., the peripheral portion which does not contact with the upper preforming mold and the lower preforming mold. Therefore, it becomes possible to transport the impregnated intermediate material in a heated state while holding it between two pieces of the release sheets.

In addition, since the release sheets do not have to be forcibly bent or cut while being in close contact with the impregnated intermediate material, handling of the release sheet becomes ease, and there is an advantage as well that it can be used repeatedly without causing wrinkles or cuts in the release sheet. Furthermore, when the material to be formed is transported in the preforming process and the forming process, the release sheet may be used as it is depending on the shape of the formed article of the composite material.

Figure 11:
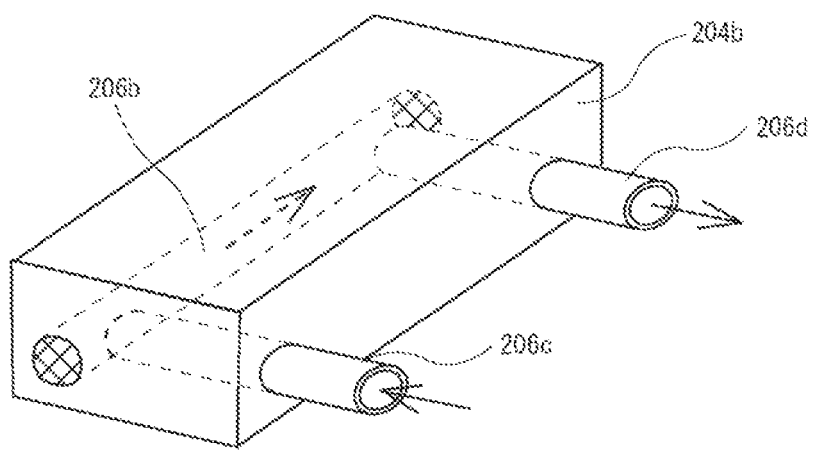
FIG. 11 is an explanatory view showing a preforming side end mold of the preforming mold shown in FIGS. 10A-10C.

FIG. 8A-8D and FIG. 9A-9D are explanatory views of a process in which an impregnated intermediate material is transported using the release sheet. FIG. 10A-10C are schematic views of the preforming mold 201 placed in the preforming part 200 used in the process as shown in FIG. 8 and, FIG. 10A is a plain view, FIG. 10B is a cross-sectional view along D-D' of FIG. 10A, and FIG. 10C is a cross-sectional view along E-E' of FIG. 10A, FIG. 11 is an explanatory view showing a side end mold of the preforming mold of the preforming mold 201 as shown in FIGS. 10A-10C.

In this example, the preforming mold 201 comprises the upper preforming mold 202 and the lower preforming mold 203, and the side end preforming molds 204a and 204b are arranged on the upper surface 203a of the lower preforming mold 203 as to surround the preforming area. The heating rods 205 are inserted into the upper preforming mold 202 and the lower preforming mold 203, whole of the preforming mold 201 can be heated by heating the heating rods 205. Further, ejector pins 207 are inserted into the upper preforming mold 202, and as will be described later, the impregnated intermediate material can be brought into a state of being placed on the release sheet 231 by moving the ejector pins 207 up and down.

The material to be formed 220 is placed on a continuous release sheet 231, and a release sheet 230 is arranged on the upper side thereof. The release sheet 231 is delivered from the delivering roller 232 and carried to the preforming region of the upper surface 203a of the lower preforming mold 203 by the carrying rollers 233 and 234 and wound up by the winding roller 235.

The side end preforming molds 204a and 204b are arranged in a rectangular shape, and a pair of side end preforming molds 204b are arranged on a pair of side portions along the carrying direction of the release sheet 231, and a pair of side end preforming molds 204a are arranged on a pair of peripheral portions crossing the carrying direction.

The pair of side end preforming molds 204a are each supported and fixed at the tip of the action bar 208b vertically movably attached to the upper preforming mold 202, and an energizing member 208a made of a compression spring is attached around the action bar 208b. The energizing member 208a is pressed against the upper preforming mold 202 and the side end preforming mold 204a, respectively, and biases the upper preforming mold 202 and the side end preforming mold 204a in the separating direction. The side end preforming mold 204a is provided with a cooling pipes 206a therein, and a coolant is supplied from a cooling device not shown to distribute.

The pair of side end preforming molds 204b are arranged on both sides of and along the release sheet 231 to be carried and provided with the cooling pipes 206b therein. As shown in FIG. 11, the side end preforming mold 204b is provided with a supply pipe 206c and a discharge pipe 206d which are interconnected to an inner cooling pipe 206b, and the coolant is supplied and distributed from the cooling device not shown.

The upper part of the upper preforming mold 202 and the lower part of the lower preforming mold 203 are each supported and fixed to a press device 210 through the insulation materials 209. The preforming region is pressurized by operating the press device 210 and moving the upper preforming mold 202 toward the lower preforming mold 203.

Figure 9A:
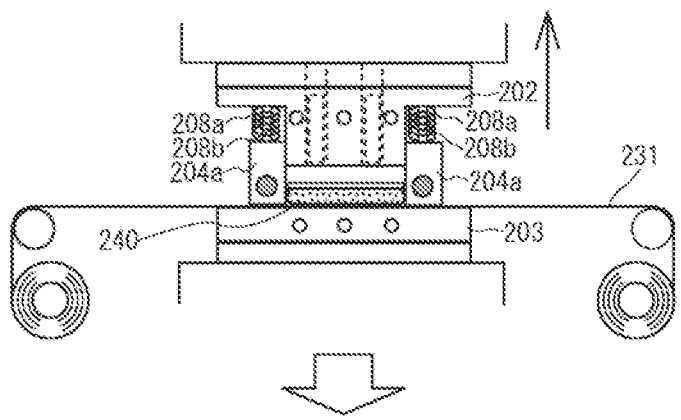
FIG. 9A-9D are explanatory views of process in which the impregnated intermediate material is transported using a release sheet.

In the preforming process, as shown in FIG. 9A, firstly, the material to be formed 220 is mounted on a continuous release sheet 231, and a release sheet 230 is arranged on the upper side of the material to be formed 220. Therefore, the material to be formed 220 is in the state of being sandwiched from the upper and lower sides by the release sheets 230 and 231. In the preforming part 200, the upper preforming mold 202 is set at an elevated standby position, accordingly, the side end preforming mold 204a are in the state of being elevated and separated from the lower preforming mold 203.

Figure 9B:
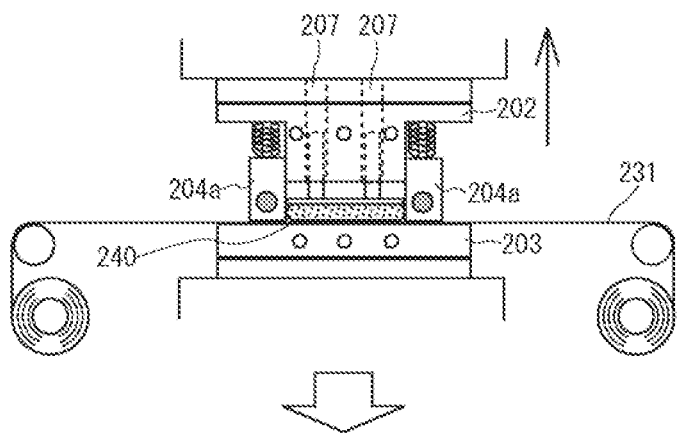

Next, carrying operation of the release sheet 231 is conducted and the material to be formed 220 is carried into the preforming region (FIG. 9B). Since the side end preforming mold 204a are in an elevated state, the material to be formed 220 is carried together with the release sheet 231. Side end preforming mold 204b are arranged on both sides of the preformed region, and the material to be formed 220 is brought into a state of being arranged between the side end preforming molds 204b. In addition, the release sheet 231 is being arranged between the material to be formed 220 and the upper surface of the lower preforming mold 203.

Figure 9C:
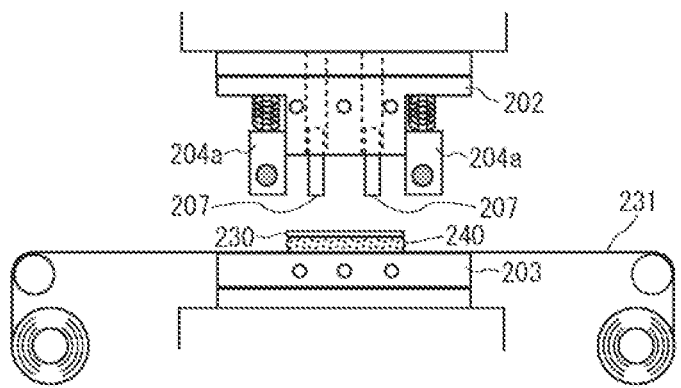
Figure 9D:
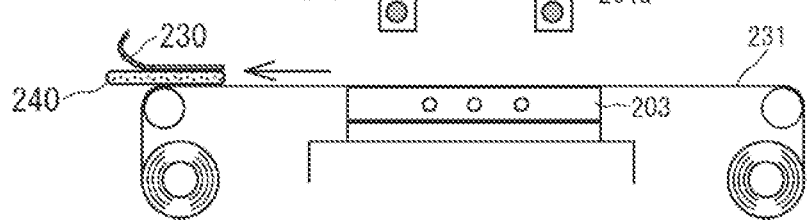

Then, the preforming upper mold 202 moves downward and the side end preforming molds 204a are arranged on both sides of the material to be formed 220 and becomes to be in contact with the release sheet 231 (FIG. 9C). By moving the upper preforming mold 202 downward further, the lower surface of the upper preforming mold 202 is pressed against the release sheet 230, and the release sheet 230 becomes to be in a state of being arranged between the material to be formed 220 and the upper preforming mold 202 (FIG. 9D). At that time, the side end preforming molds 204a are pressured against and adhered to the release sheet 231 and brought into a state of being arranged to surround the peripheral portion of the material to be formed 220. With the lowering of the upper preforming mold 202, the action bar 208b fitted with the side end preforming mold 204a is pushed into the upper preforming mold 202. Therefore, the energizing member 208a attached between the upper preforming mold 202 and the side end preforming mold 204a gets to a compressed state.

In the preforming mold 201, the material to be formed 220 set in the preforming region is heated and pressurized by the upper preforming mold 202 and the lower preforming mold 203, and the coolant is distributed in the side end preforming molds 204a and 204b to cool the peripheral portion where the release sheet is not arranged.

Then, the thermoplastic resin material of the material to be formed 220 is melted so that the integrally configured impregnated intermediate material 240 in which the thermoplastic resin material is impregnated into the fiber material is preformed.

Next, as shown in FIG. 9A, the upper preforming mold 202 is raised to separate the lower surface from the release sheet 230. At that time, the action bars 208b are drawn out from the upper preforming mold 202 by the energizing force of the energizing member 208a, so that the side end preforming molds 204a are maintained in the close contact with the release sheet 231.

Next, in a state that the upper preforming mold 202 is separated from the release sheet 230, the ejector pins 207 are lowered and set to a state of being in contact with the release sheet 230, and the upper preforming mold 202 is further raised (FIG. 9B). As the upper preforming mold 202 is raised, the side end preforming molds 204a are raised and separated from the impregnated intermediate material 240 while the release sheet 230 together with the impregnated intermediate material 240 are pressed by the ejector pins 207, the upper preforming mold 202 and the side end molds 204a can be raised while keeping the heated state and the formed shape of the impregnated intermediate material 240 (FIG. 9C).

Then, the carrying operation of the release sheet 231 is conducted and the impregnated intermediate material 240 is transported to the next forming process (FIG. 9D). At that time, by peeling off the release sheet 230 from the impregnated intermediate material 240, the impregnated intermediate material 240 can be delivered to the forming process while keeping the heated state and the formed shape. As a peeling means of the release sheet 230, for example, by using a means provided with a gripping member that grips the tip of the release sheet 230 and a movement mechanism to moves it to the opposite side of the carrying direction, the release sheet 230 can be easily peeled off. Further, if not be formed into a complex shape, it may be introduced into the forming process with the release sheet 230 left attached thereto and formed.

As described above, since the impregnated intermediate material 240 is taken out with the release sheet being in contact therewith and transported to the forming process from the preforming part 200, the preforming can be efficiently performed and the impregnated intermediate material 240 can be easily handled.

Further, in the transport process, since the impregnated intermediate material 240 is taken out after the side end preforming molds 204a which are a mold portion of the side end of the preforming mold 201 contacting with the impregnated intermediate material 240 at least at the portion where the release sheets are not arranged is separated, the impregnated intermediate material 240 can be taken out in the formed shape while keeping the heated state.

When the material to be formed is heated and pressurized and thereby formed into the impregnated intermediate material, the impregnation intermediate material is formed into an extended shape from the shape of the material to be formed before pressurization. For this reason, the impregnated intermediate material contacts with the preforming mold in a pressurized state and applies a force acting to expand the preforming mold when expanding. Since the impregnated intermediate material thus formed is being pressed against the preforming mold and stretched, further, the heated thermoplastic resin material is easy to flow and the shape is easy to break, it is difficult to take out it from the preforming mold without breaking the formed shape. Therefore, by moving the mold portion of the preforming mold which is in contact with the impregnated intermediate material at least at the portion where the release sheet is not arranged to bring the impregnated intermediate material and the mold portion into a separated state, the impregnated intermediate material can be easily taken out with the release sheet being in contact therewith.

Further, by using a flexible material for the release sheet, in the transport process, after having taken out the impregnated intermediate material with the release sheet being in contact therewith, the release sheet can be peeled off from the impregnated intermediate material like to gradually turn from the end. Thus, it is possible to transport the impregnation intermediate material to and introduced into the forming process without breaking the shape of it. Therefore, it becomes possible to efficiently mold high quality formed articles.

When the formed article of the composite material has a complicated shape, for example, a shape having a rib or a boss shape, a shape having a corner portion of rounded shape, it is impossible to perform the forming process in which the impregnated intermediate material is formed by pressurizing while keeping contact of the preformed impregnated intermediate material with the release sheet. Therefore, after the impregnated intermediate material is taken out from the preforming mold with the release sheet being in contact therewith, the release sheet is separated therefrom, and only the impregnated intermediate material can be pressurized and formed in the forming process, so that the complicated formed article of the composite material can be obtained.

FIG. 12A-12F are explanatory views of process showing a modified forming process. In this example, it shows a process in which the impregnated intermediate material 240 which is formed in the preformed process described in FIG. 8 to FIG. 9 is transported and formed. In the forming process, the forming is performed using a forming mold body 250 accommodating the impregnated intermediate material 240, a heating press part 260 for pressurizing the forming mold body 250, and a cooling press part 270 for pressurizing the forming mold body 250.

The forming mold body 250 comprises an upper forming mold body 251 and a lower forming mold body 252, the impregnated intermediate material 240 is accommodated between the upper forming mold body 251 and the lower forming mold body 252. The upper forming mold body 251 and the lower forming mold body 252 are removably attached to the heating press part 260 and the cooling press part 270, respectively. For example, they can be attached by known means such as a mechanical locking mechanism or magnetic force by an electromagnet.

The heating press part 260 comprises an upper heating press mold 261 having heating rods therein and a lower heating press mold 262 having heating rods therein, and an upper part of the upper heating press mold 261 is fixed to the press device 264 through the insulation material 263, and the lower part of the lower heating press mold 262 is fixed to the press device 264 through the insulation 263. The upper forming mold body 251 is to be removably attached on the lower surface of the upper heating press mold 261, and lower forming mold body 252 is removably attached to the upper surface of the lower heating press mold 262.

The cooling press part 270 comprises an upper cooling press mold 271 provided with cooling pipes therein and a lower cooling press mold 272 provided with cooling pipes therein. The upper part of the upper cooling press mold 271 is fixed to the press device 274 through an insulation material 273, and the lower part of the lower cooling press mold 272 is fixed to the press device 274 through the insulation material 273. The upper forming mold body 251 is configured to be attached to the lower surface of the upper forming mold body 271 removably, the lower forming mold body 252 is configured to be attached to the upper surface of the lower cooling press mold 272 removably.

Figure 12A:
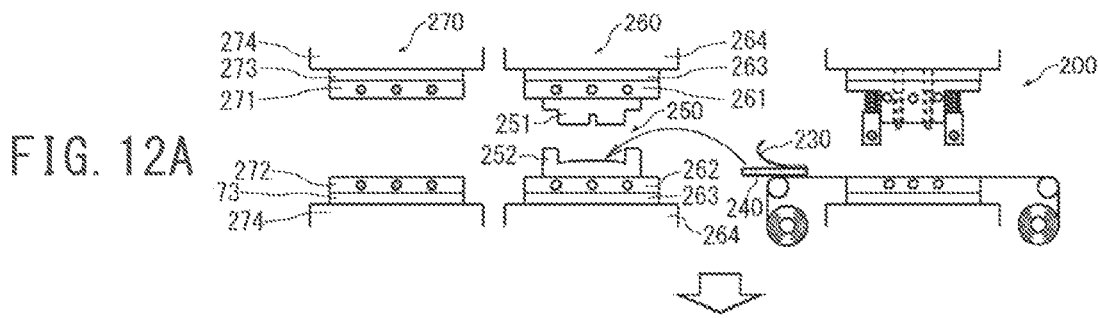
FIG. 12A-12F are explanatory views of process showing a modified forming process.

In the forming process, the upper forming mold body 251 and the lower forming mold body 252 are attached to the upper heating press mold 261 and the lower heating press mold 262, respectively, with the heating press part 260 left open (FIG. 12A). It should be noted that the heating press part 260 has been subjected to a preliminary heating treatment, and the upper forming mold body 251 and the lower forming mold body 252 are being uniformly heated. It is preferable that the forming mold body 250 is set to a state of being heated at the melting temperature or above of the thermoplastic resin material. And the impregnated intermediate material 240 transported from the preforming process is introduced into the lower forming mold body 252 and accommodated in a predetermined position.

Figure 12B:
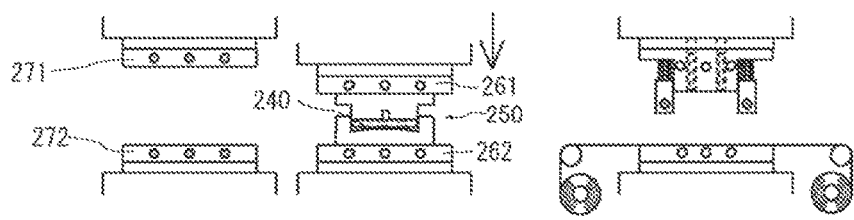
Figure 12C:
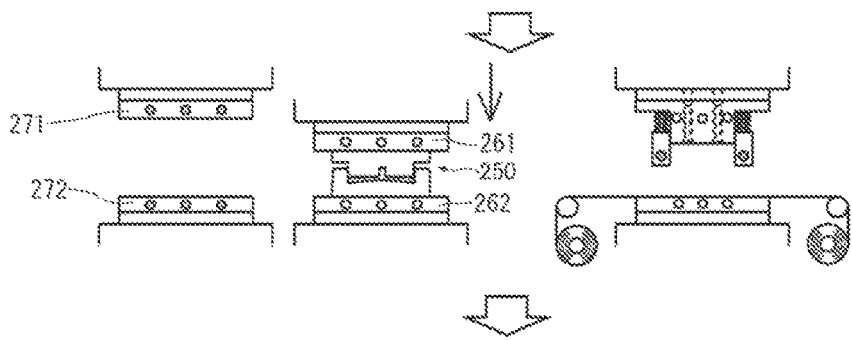

Next, the upper heating press mold 261 is lowered and the upper forming mold body 251 is moved toward the lower forming mold body 252 and brought into a state of contacting with the impregnated intermediate material 240 (FIG. 12B). Furthermore, the upper heating press mold 261 is lowered to press the upper forming mold body 251 against the impregnated intermediate material 240, the forming mold body 250 is pressurized and clamped. (FIG. 12C).

Since the forming mold body 250 is heated to the melting temperature or above of the thermoplastic resin, a smooth flow can be obtained when forming the impregnated intermediate material 240 into the formed article of the composite material, a more complicated shape can be formed with less disturbance in the fiber orientation.

Figure 12D:
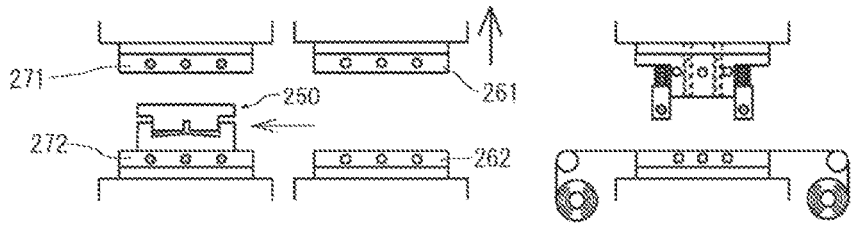
Figure 12E:
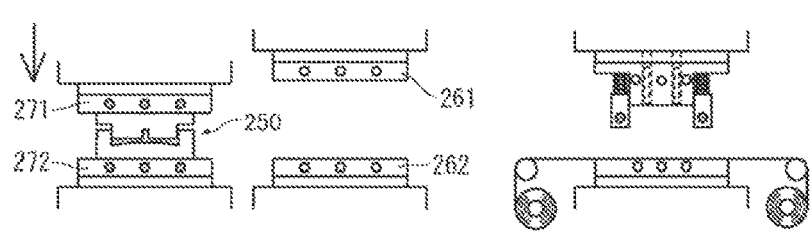
Figure 12F:
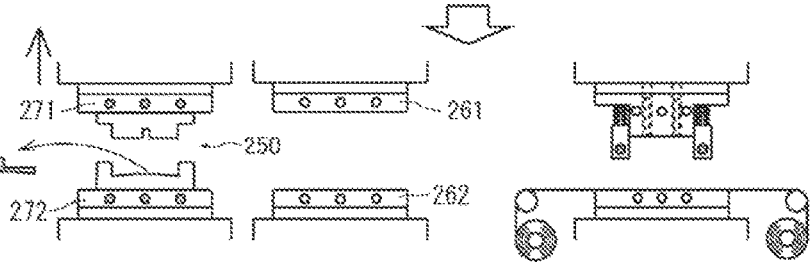

Then, the heating press part 260 is set to be left open, and the forming mold body 250 is transported to the cooling press part 270 (FIG. 12D). The cooling press part 270 is previously cooled to a temperature at which the thermoplastic resin material solidifies. Then, the upper cooling press mold 271 is lowered to set the forming mold body 250 to a pressurized state and a cooling treatment is applied thereto (FIG. 12E). After performing the cooling treatment, the upper cooling press mold 271 is raises with the upper forming mold body 251 attached thereto to make the forming mold body 250 left open, then a formed article 280 is taken out.

Since the forming mold body is subjected to the cooling treatment as it is, a formed article which is solidified without losing shape can be obtained, and the forming process can be dealt with in a short time.

FIG. 13A-13F are explanatory views of another modified forming process. In this example, a forming process is shown in which the impregnated intermediate material 240 formed in the preforming process described with reference to FIG. 8 to FIG. 9 is transported and formed. In the forming process, the forming is performed using the forming mold body 310 accommodating the impregnated intermediate material 240 and a pressing part 300 pressurizing forming mold body 310.

The forming mold body 310 comprises an upper forming mold body 311 and a lower forming mold body 312 and is previously subjected to a heating treatment to the melting temperature or above of the thermoplastic resin material by a heating device not shown. The press part 300 comprises an upper press mold 301 which is provided with the distribution pipes therein, and a lower press mold 302 which is provided with the distribution pipes therein, the upper part of the upper press mold 301 is fixed to the press device 304 through an insulation material 303, and the lower part of the lower press mold 302 is fixed to the press device 304 through the insulation material 303.

Figure 13A:
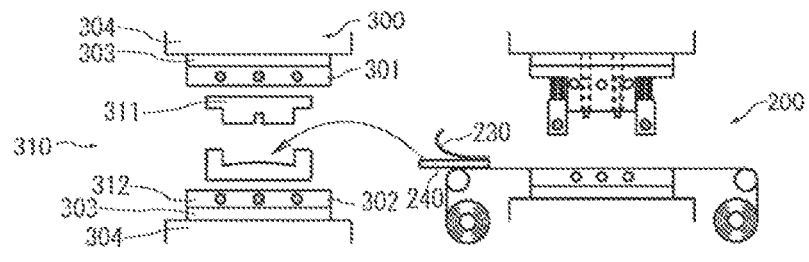
FIG. 13A-13F are explanatory views of showing another modified forming process.
Figure 13B:
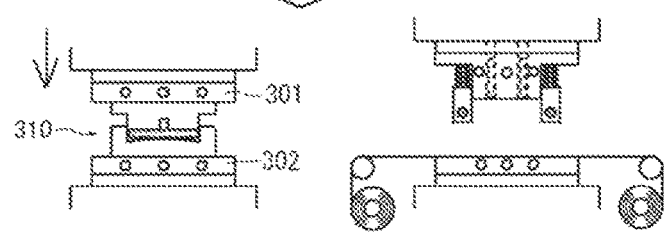

At first, the press part 300 is set to be left open, the forming mold body 310 which is previously subjected to the heating treatment is arranged between the upper press mold 301 and the lower press mold 302, the forming mold body 310 is opened, the impregnated intermediate material 240 is introduced into it (FIG. 13A). And the upper forming mold body 301 and the lower forming mold body 302 are set to be left closed in which the impregnated intermediate material 240 is accommodated therebetween and placed in a predetermined position on the upper surface of the lower press mold 302, and the upper forming mold body 311 is pressurized by lowering the upper press mold 301. (FIG. 13B).

It should be noted that, distribution pipes are arranged in the upper press mold 301 and the lower press mold 302, and a coolant having a temperature at which the thermoplastic resin material can solidify is distributed.

Figure 13C:
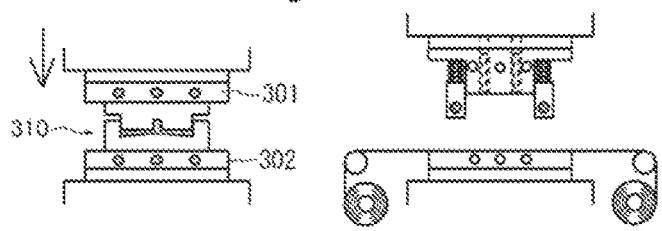
Figure 13D:
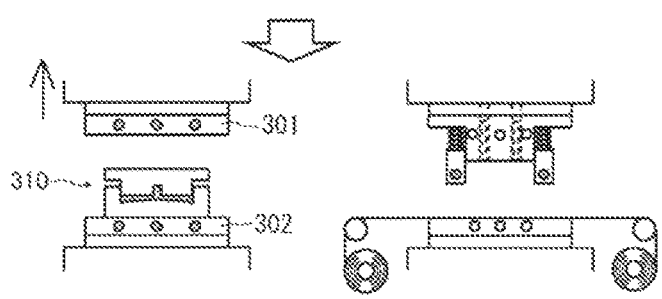
Figure 13E:
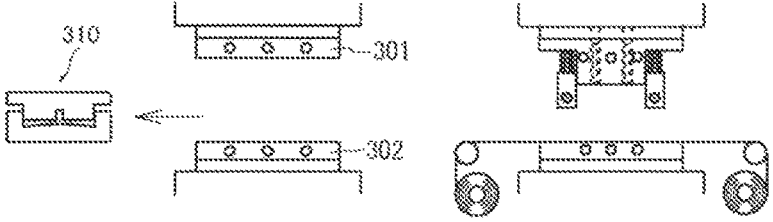
Figure 13F:
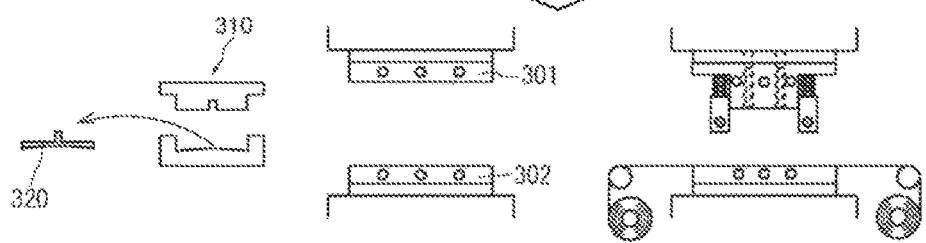

Clamping the forming mold body 310 while the press part 300 is pressurized, since the forming mold body 310 is in the heated state at the early stage, in the meantime, the thermoplastic resin material of the impregnated intermediate material may flow smoothly between them and forming of complicated shape is smoothly performed. In addition, since the upper press mold 301 and the lower press mold 302 are cooled, the forming mold body 310 is gradually cooled, and the thermoplastic resin material solidifies (FIG. 13C). After performing the cooling treatment, the upper press mold 301 is raised to set the upper press mold 300 to be left open (FIG. 13D), and the forming mold body 310 in the clamped state is taken out (FIG. 13E). Then, a formed article 320 is taken out with the forming mold body 310 is left open.

In this example, in forming process, the impregnated intermediate material is heated once to increase fluidity, so that it may be formed into a complicated shape with good fiber orientation corresponding to a complicated shape, and thereafter the cooling treatment is performed, forming time can thereby be shortened.

It should be noted that, in the process shown in FIG. 12, while the heating and forming time can be controlled, in the process shown in FIG. 13, the heating state is determined by the heat conduction time of the cooling temperature set in the lower press mold, the forming time cannot be controlled, the process shown in FIG. 12 and the process shown in FIG. 13 are different on this point. On the other hand, in the process shown in FIG. 13, since the forming can be performed using one press part, forming cost can be lowered compared to the process shown in FIG. 12.

PRACTICAL EXAMPLE

Practical Example 1

<Used Materials>
Fiber material: Carbon fiber bundle (manufactured by Toray Industries; T700SC-60E-12000 pieces/bundle, single yarn diameter 0.007 mm)

Thermoplastic resin material: PA6 made resin film (manufactured by Mitsubishi Plastics Corporation; DIAMIRON 180 mm width, 0.02 mm thickness, melting point 220° C.)
<Method for Manufacturing Thermoplastic Thin Layer Semi-Prepreg Sheets>

It was carried out by a device having configuration in which known opening devices (for example, an opening device described and shown in FIGS. 15A and 15B in Japanese Patent No. 5553074) are attached to a known manufacturing device of thermoplastic thin layer semi-prepreg sheet (for example, a device in which, in the device described and shown in FIGS. 5 and 6 in Japanese Patent Laid-Open No. 2017-31342, an extrusion forming device in the device configuration shown in FIG. 5 is removed and a mechanism for introducing a thermoplastic resin film is attached) at both sides of the thermoplastic thin layer semi-prepreg sheet.

It should be noted that, in the device described with respect to FIG. 5 of Japanese Patent Laid-Open No 2017-31342, the device is configured to have a series of paired heating rolls, but the device of this Practical Example is configured to have a series of single heating roll and a series of paired cooling rolls.

As a carrier belt, a fluorine belt (G-type belt) manufactured by Chukoh Belt Co., Ltd. was used. The temperature of the heating roll was set to 270° C. and the pressure between the heating rolls was set to a linear pressure of 25 kgf/cm. Furthermore, a mechanism was employed in which the heating roll was drivingly rotated by a drive motor so that the processing speed was 20 m/min and the cooling roll was freely rotated.

In each opening device, five carbon fiber bundles were each opened to 38 mm to obtain an opened yarn sheet having a width of 190 mm and a base weight of about 21 g/m$^2$, and opened yarn sheets were slightly shifted in the width direction each other so that ends of opened fiber bundles did not overlap in the thickness direction, and were continuously introduced from both sides to the heating rolls shown in FIG. 5 in Japanese Patent Laid-Open No 2017-31342.

Further, from one heating roll of the series of heating rolls shown in FIG. 5 of Japanese Patent Laid-Open No 2017-31342, the PA6 resin film was introduced on the opened yarn sheet along therewith, and when the PA6 resin film became to be a molten state, it was pressurized while sandwiching it with opened yarn sheets by the series of heating rolls, and semi-prepreg state in which the open yarn sheet was slightly impregnated with PA6 resin film was obtained.

Thereafter, by passing through cooling rolls, the sheet was cooled, peeled off from the carrier belt, and both ends were slit, and continuously wound onto a 3-inch paper tube as a thermoplastic thin layer semi-prepreg sheet.

In this manufacturing, the thermoplastic thin layer semi-prepreg sheet of 160 mm width and 1000 m length were obtained by doing manufacturing for 50 minutes. The resulting thermoplastic thin layer semi-prepreg sheet had the basis weight of 65 g/m$^2$ (fiver base weight: about 42 g/m$^2$), the thickness in the impregnated state was about 0.043 mm and the volume content of fiber was about 54% according to the calculation. The thickness of the thermoplastic thin layer semi-prepreg sheet was measured at 10 locations using outer micrometer (manufactured by Mitutoyo Co., Ltd.) with a minimum display scale of 0.001 mm, and the average value of the measurement result was about 0.063 mm.
<Method for Manufacturing Formed Article>

Obtained thermoplastic thin layer semi-prepreg sheet was laminated 8 times for every 4 sheets in the order of [45/0/−45/90], and thereafter laminated 8 times for every 4 sheets in the order of [90/−45/0/45] so as to laminate symmetrically in the thickness direction, and hand lay-up of a total of 64 sheets were performed so that they become a laminated article with the size of 490 mm×490 mm, and a sheetlike laminated article was thereby formed.

It should be noted that a heating rod having a diameter of 3 mm was used, and the end of the heating rod was heated at 270° C., thermoplastic thin layer prepreg sheets were dot welded for every 4 to 5 sheets whenever they are laminated and integrated as a laminated article. This laminated article was employed to be the material to be formed.
<Method for Manufacturing Formed Article of Composite Material>

The formed article of the composite material (rectangular-shaped laminated sheet) laminated to be pseudo-isotropic was manufactured as having a thickness of 2.75 mm and a size of about 500 mm width×about 500 mm length.

As a preforming mold, the device configuration as shown in FIG. 1 was used, the upper mold and the lower mold for obtaining the impregnated intermediate flat platelike material of 495 mm width×495 mm length were employed, and the side end preforming mold was made to be provided with the cooling pipes therein to impart a cooling function.

Moreover, a gap adjustment jig was employed so that the impregnated intermediate material was not to be clamped at 2.75 mm or below in thickness when the preforming mold was clamped.

As a release sheet, a glass cloth containing fluorine sheet manufactured by Chukoh Belt Co., Ltd. (thickness 0.1 mm) was used and arranged on the surfaces on both sides of the article to be formed. It should be noted that the release sheet was formed in rectangular shape of about 495 mm length× about 495 mm width permitting smooth accommodation in the preforming mold. As a thickness adjustment jig, a SUS manufactured spacer of 2.95 mm thickness was used considering the thickness of the impregnated intermediate material after preforming and the thickness of the release sheet.

The upper and lower heating and pressurizing faces was heated to 250° C. and the side end preforming mold was cooled to reach at 100° C. by circulating a cooling oil.

As a forming mold, the device configuration as shown in FIG. 1 was used, the upper mold and lower mold capable to form a flat platelike formed article of composite material having 500 mm width×500 mm length was employed. The temperature of the forming mold was controlled to be at 150° C.

After introducing the material to be formed which was arranged with the release sheets on both sides, the preforming mold was clamped. Thereafter, pressurizing operation was carried out at 0.5 MPa for 1 minute, subsequently, the pressurizing operation was carried out at 5 MPa for about 2 minutes, the impregnated intermediate material was thereby formed.

Next, the upper mold and lower mold of the preforming mold were left open, the side end preforming mold was separated from the impregnated intermediate material to obtain the impregnated intermediate plate material. it was confirmed that it was formed into a substantially rectangular shape of about 495 mm×495 mm and thermoplastic resin material and fiber material were slightly seeping out from the periphery. Then, the impregnated intermediate material was transported to the forming mold with the release sheets left attached thereto.

After peeling off the release sheets, the impregnated intermediate material was accommodated in the forming mold and subjected to the cooling treatment at 150° C. while being pressurized at 5 MPa for 3 minutes. Thereafter the upper mold and the lower mold of the forming mold were left open, a pseudo-isotropic laminated plate in which the thermoplastic resin material was impregnated into the carbon fiber bundle and solidifies, i.e., the formed article of the composite material was obtained.

<As for Impregnated Intermediate Material>

It could be introduced into the forming mold without losing shape in a state that there was little adhesion to the side end preforming mold while keeping the formed shape and a heated state.

<The State of the Formed Article of Composite Material (the Pseudo-Isotropic Laminated Plate)>

A warpage free pseudo-isotropic laminated plate of 2.75 mm thick could be obtained. Though the thermoplastic resin material and fiber material flowed out slightly to the peripheral portion of the pseudo-isotropic laminated plate, so that it was formed into a size of about 500 mm×about 500 mm, in the region of 490 mm×490 mm inside the periphery, there is almost no disturbance of the fiber material, a high quality article of composites material could be obtained. Then, by cutting off the surrounding of the pseudo-isotropic laminated plate, it was possible to finish it into a in pseudo-isotropic laminated plate having a size of about 480 mm width×about 480 mm length.

Practical Example 2

<Used Materials>

A fiber material and a thermoplastic resin material same as those in Practical Example 1 were used.

<A Method for Manufacturing Material to be Formed>

A known device for manufacturing a reinforced pseudo-isotropic sheet material (for example, in the manufacturing device described and shown in FIG. 4 in Japanese Patent Laid-Open No. 2016-27956, the sheet material feeding mechanism using the cutting mechanism for the sheet material, the chop material carrying mechanism employing two distributing conveyers, the sheet integrating mechanism employing one adhesive roll device, and the sheet winding mechanism) were used.

Thermoplastic thin layer semi-prepreg sheet of 160 mm width manufactured in the same way as in Practical Example 1 was cut to a width of 5 mm along the fiber direction and cut to a length of 20 mm along a direction orthogonal to the fiber direction, so that a chopped tape in the shape of elongated strip was manufactured. Feeding operation was performed in that feeding speed of the thermoplastic thin layer semi-prepreg sheet was set to about 30 m/minute.

Next, the obtained chopped tape of 5 mm width×20 mm length was freely dropped on a carrier belt made of a wire net from two places and was dispersed. The carrier belt travelled at the carrying speed of 2 m/min and the chopped tapes were made dispersed within the area of 500 mm width. Since chopped tape were made from the thermoplastic thin layer semi-prepreg sheet of 160 mm width at the processing speed of 30 m/min, and the pseudo-isotropic reinforced sheet material of 500 mm width was manufactured at the processing speed of 2 m/min, The average number of sheets in the direction of the thickness of the chopped tapes which were superposed on the carrier belt was about 5 sheets.

Thereafter, as an adhesive roll device, a mechanism in which the cooling roll and the heating roll was combined to carry the sheet material while pressurizing it by a Teflon®. belt was used. The pseudo-isotropic reinforced sheet material was formed by heating the heating roll to 280° C. to adhere and integrate the overlapped chopped tapes each other. Then, it was wound on a 12-inch paper tube. The basis weight of the pseudo-isotropic reinforced sheet material was about 320 g/m². The obtained pseudo-isotropic reinforced sheet material was cut to a size of 490 mm width×490 mm length, and a laminated article in which 15 sheets thereof were stacked was used as the material to be formed. It should be noted that the weight of the material to be formed was about 1150 g.

<The Method of Manufacturing the Formed Article of Composite>

A formed article of a composite material of 3 mm thick, 500 mm width×500 mm length which was laminated to be pseudo-isotropic (a chopped laminated platelike formed body) was manufactured.

As the preforming mold and the forming mold, mold same as those in example 1 were used. The gap adjustment jig was employed so that the impregnated intermediate material was not clamped at 3 mm or less in thickness when the preforming mold was clamped.

As the release sheet, same sheet as in Practical Example 1 was used, and it was formed in a size of 495 mm length×495 width so that it could be accommodated smoothly in the preforming mold. As a gap adjustment jig, the SUS manufactured spacer of 3.2 mm thickness was used considering the thickness of the impregnated intermediate material after preforming and the thickness of the release sheet.

The upper and lower heating and pressurizing surfaces of the preforming mold ware heated to 250° C., the side end preforming mold placed on the upper surface of the lower mold was cooled so as to become 100° C. or less by circulating a cooling oil.

The release sheets were arranged on both sides of the material to be formed of 490 mm width×490 mm length, then, the material to be formed was introduced into the preforming mold. Clamping the preforming mold, pressurizing at 0.5 MPa for 1 minute, then, the impregnated intermediate material was formed by pressuring at 5 MPa for 2 minutes.

Next, the upper mold and lower mold of the forming mold were left open, the side end preforming mold was separated from the impregnated intermediate material, so that the impregnated intermediate flat platelike material of 495 mm width×495 mm length could be obtained. And the impregnated intermediate material which became to be easily movable was taken out of the preforming mold with the release sheet being adhered thereto and transported.

After peeled off the release sheet from the impregnated intermediate material, the impregnated intermediate material was accommodated into the forming mold, after the forming mold was clamped, the impregnated intermediate material was subject to a cooling treatment at 150° C. for 3 minutes while being pressurized at 5 MPa. Thereafter, the upper mold and the lower mold were left open, and the formed article, i.e., the chopped laminated platelike formed body in which the thermoplastic resin material was impregnated into the carbon fiber bundles and solidified was obtained.

<With Respect to the Impregnated Intermediate Material>

The impregnated intermediate material was scarcely adhered to the side end preforming mold, and it could be taken out thereof without losing shape while keeping the formed shape and the heated state. The release sheet could be peeled off from the impregnated intermediate material without wrinkles or tears by gradually peeling off therefrom. Then, only the impregnated intermediate material could be introduced into the mold for mold without breaking the formed shape.

<States of the Formed Article of Composite Material (Pseudo-Isotropic Laminated Plate)>

A warpage free chopped laminated platelike formed body of about 500 mm×about 500 mm with a thickness of 3 mm was obtained. Though the thermoplastic resin material and fiber material flowed out slightly at the peripheral portion of the chopped laminated platelike formed body, a high quality formed article of composite material was obtained. Then, the chopped laminated platelike formed body could be finished to a size of about 490 mm width×about 490 mm length by cutting off the surroundings.

Practical Example 3

<Used Materials>

Same fiber material and thermoplastic resin material (thermoplastic resin material) as those in Practical Example 1 were used.

<Method for Producing the Material to be Formed>

A pseudo-isotropic reinforced sheet material same as in Practical Example 2 was used. The obtained pseudo-isotropic reinforced sheet material was cut to a size of 280 mm length×280 mm width, and a laminated article of 10 sheets stacked was used as the forming material. It should be noted that the weight of the material to be formed was about 250 g.

<Method for Manufacturing Formed Article of Composite Material>

The formed article of the composite material was manufactured using the forming mold 400 shown in FIG. 14. The formed article of the composite material is set to be pseudo-isotropic and to have an outer diameter of 300 mm width×300 mm length, 1.3 mm sheet thickness, and recesses of 100 mm width×100 mm length×30 mm depth provided at the center thereof. It should be noted that the vertical wall portion of the center portion is set to a shape having an inclination of about 5 degrees.

As preforming mold, using the device shown in FIG. 1, the upper preforming mold and the lower preforming mold for forming the impregnated intermediate flat platelike material having a size up to 495 mm width×495 mm length were set. The gap adjustment jig was placed on the upper surface of the side end preforming mold that was to be arranged on the upper surface of the lower preforming mold. In this example, for preforming the impregnated intermediate material having the size up to 290 mm width×290 mm length, as the gap adjustment jig, the SUS manufactured spacer of about 2.2 mm thickness was used considering the thickness of the release sheet. Moreover, the upper and lower heating and pressurizing surfaces of the preforming mold were heated to 250° C. It should be noted that in this Practical Example, the side end mold was not cooled.

As the release sheet, fluorine sheets containing glass cloth (about 0.1 mm thickness) manufactured by Chukoh Belt Co., Ltd. same as in Practical Examples 1 and 2 ware used and arranged on both sides of the material to be formed. It should be noted that the release sheet was formed in a size of about 300 mm length×about 300 mm width.

The forming mold 400 were set in a preheated state and temperature of the mold were controlled to be kept at 150° C.

After introducing the material to be formed with the release sheets arranged on both sides thereof into the preforming mold, the preforming mold was clamped. Thereafter, pressurizing operation was carried out at 0.5 MPa for 1 minute, then pressurizing operation was carried out at 5 MPa for 2 minutes, so that the impregnated intermediate material was formed.

Then, the upper and lower mold of the preforming mold were left open, the impregnated intermediate plate material was obtained. It was formed in a substantially rectangular shape and size of about 290 mm×about 290 mm in a state that thermoplastic resin and fiber material were slightly seeping out from the peripheral portion. In addition, the impregnated intermediate material was taken out from the preforming mold with the release sheets being attached thereto, after the release sheets attached to both sides of the impregnated intermediate material were peeled off, the impregnated intermediate material in heated state was transported to the forming mold 400.

The impregnated intermediate material was accommodated in the forming mold 400, the forming mold 400 were then clamped, and the forming mold 400 were cooled at 150° C. while pressurizing at 5 MPa for 3 minutes. Thereafter, the upper mold and the lower mold of the forming mold were left open, a high quality formed article of composite material 410 was obtained in which the thermoplastic resin material was impregnated into the fabric material and solidified. The formed article of the composite material 410 could be finished in a shape being pseudo-isotropic with a recess in the center portion.

<With Respect to Impregnated Intermediate Materials>

An impregnated intermediate material was formed to be nearly square slightly expanded from the size when the material to be formed was introduced, Furthermore, the impregnated intermediate material could be easily taken out from the mold for preforming with release sheets attached thereto while keeping a heated state without breaking the formed shape. Furthermore, using a flexible material, the release sheet could be gradually peeled off from the edge and could be peeled off from the impregnated intermediate material without causing wrinkles or tearing in the release sheet. Therefore, the impregnated intermediate material from which the release sheets were peeled off could be introduced into the forming mold while keeping it in the heated state without a collapse of the formed shape.

<States of the Formed Article of Composite Material>

The formed pseudo-isotropic article of composite material could be obtained which had a size of 300 mm width× 300 mm length, a shape having recesses of a size of 100 mm width×100 mm length×30 mm depth at the center and was composed of chopped laminated material of 1.3 mm plate thickness. The formed article of the composite material was formed to be high quality without warpage etc. In this Practical Example, since the peripheral portion of the impregnated intermediate material was not cooled and was accommodated in the forming mold while keeping the heated state, it became possible to accommodate it in the forming mold in a formed state of a size of about 290 mm×about 290 mm, and to form it to a shape expanded to a size of about 300 mm×about 300 mm due to pressurization of the forming mold. In addition, the peripheral portion of the formed article of the composite material could be finished in a good condition without unevenness.

REFERENCE SIGNS LIST

1 . . . preforming part, 1a . . . preforming mold, 2 . . . upper preforming mold, 3 . . . lower preforming mold, 4 . . . side end preforming mold, 5 . . . heating rod, 6 . . . gap adjusting jig, 7 . . . ejector pin, 8 . . . insulation material, 9 . . . press device, 10 . . . forming part, 10a . . . forming mold, 11 . . . upper forming mold, 12 . . . lower forming mold, 13 . . . cooling pipe, 14 . . . ejector pin, 15 . . . insulation material, 16 . . . press device, 20 . . . material to be formed, 21 . . . thermoplastic resin material, 22 . . . fabric material, 30 . . . release sheet, 40 . . . impregnated intermediate material, 50 . . . formed article, 100 . . . forming part, 101 . . . preforming mold, 102 . . . upper preforming mold, 103 . . . lower preforming mold, 104 . . . side end preforming mold, 105 . . . heating rod, 106 . . . cooling pipe, 107 . . . ejector pin, 200 . . . preforming part, 201 . . . preforming mold, 202 . . . upper preforming mold, 203 . . . lower preforming mold, 204a,204b . . . side end preforming mold, 205 . . . heating rod, 206a~206d . . . cooling pipe, 207 . . . ejector pin, 208a . . . energizing member, 208b . . . action bar, 209 . . . insulation material, 210 . . . press device, 220 . . . material to be formed, 230 . . . release sheet, 231 . . . release sheet, 232 . . . delivering roller, 233,234 . . . carrying roller, 235 . . . winding roller, 240 . . . impregnated intermediate material, 250 . . . forming mold, 251 . . . upper forming mold, 252 . . . lower forming mold, 260 . . . heating press part, 261 . . . upper heating press mold, 262 . . . lower heating press mold, 263 . . . insulation material, 264 . . . press device, 270 . . . cooling press part, 271 . . . upper cooling press mold, 272 . . . lower cooling press mold, 273 . . . insulation material, 274 . . . press device, 280 . . . formed article, 300 . . . pressing part, 301 . . . upper press mold, 302 . . . lower press mold, 303 . . . insulation material, 304 . . . press device, 310 . . . forming mold body, 311 . . . upper forming mold body, 312 . . . lower forming mold body, 320 . . . formed article, 400 . . . forming mold, 410 . . . formed article.

The invention claimed is:

1. A method for manufacturing a formed article of a composite material, the method comprising:
   a preforming process in which a material comprising thermoplastic resin material and fabric material is accommodated in a preforming mold with a release sheet being arranged between said material and said preforming mold, is heated, is pressurized to impregnate said thermoplastic resin material into said fabric material, and is thereby preformed into an impregnated intermediate material, said release sheet being flexible;
   a transport process in which said impregnated intermediate material is taken out from said preforming mold in a heated state with said release sheet left attached thereto, and after said impregnated intermediate material is taken out said preforming mold, said release sheet is peeled off of said impregnated intermediate material; and
   a forming process in which said impregnated intermediate material, which has been taken out from said preforming mold, without said release sheet is accommodated in a forming mold in the heated state and is formed into the formed article of the composite material by pressurizing, the formed article of the composite material being a fiber-reinforced composite material.

2. The method for manufacturing the formed article according to claim 1, wherein, in said preforming process, said impregnated intermediate material is preformed into a developable surface shape.

3. The method for manufacturing the formed article according to claim 1, wherein, in said preforming process, said material, which is accommodated in said preforming mold, is heated to a molten temperature or above of said thermoplastic resin material.

4. The method for manufacturing the formed article according to claim 1, wherein, in said preforming process, the material is pressurized to impregnate said thermoplastic resin material into said fabric material by pressurization against said preforming mold until a shape thickness in the pressurization direction of said material becomes a set thickness, and said pressurization against said preforming mold is stopped immediately after said shape thickness becomes said set thickness.

5. The method for manufacturing the formed article according to claim 1, wherein, in said preforming process, at least a portion of said material where said release sheet is not arranged is cooled.

6. The method for manufacturing the formed article according to claim 5, wherein, the cooling of at least at the portion of said material where said release sheet is not arranged is performed before said material is accommodated in said preforming mold.

7. The method for manufacturing the formed article according to claim 1, wherein, in said transport process, a mold portion of said preforming mold, which is in contact with said impregnated intermediate material at least at a portion of said impregnated intermediate material where said release sheet is not arranged, is separated from said impregnated intermediate material before said impregnated intermediate material is taken out of said preforming mold.

8. The method for manufacturing the formed article according to claim 1, wherein, in said forming process, said forming mold is attached to a heating press, and after said impregnated intermediate material is accommodated in and pressurized by said forming mold, said forming mold is accommodated in a cooling press and is pressurized.

9. The method for manufacturing the formed article according to claim 8, wherein, in said forming process, when said impregnated intermediate material is accommodated in said forming mold, said forming mold is preheated by the heating press.

10. The method for manufacturing the formed article according to claim 1, wherein, in said forming process, when said impregnated intermediate material is accommodated in said forming mold, the forming mold is preheated, and said forming mold accommodating said impregnated intermediate material is further accommodated in a cooling press and is pressurized.

11. The method for manufacturing the formed article according to claim 1, wherein, in said preforming process, an area of said material where said material is heated and pressurized is smaller than an area of said preforming mold where said preforming mold is heated and pressurized.

12. The method for manufacturing the formed article according to claim 1, wherein, in said forming process, an area of said material where said material is pressurized is smaller than an area of said forming mold where said forming mold is pressurized.

13. An apparatus for manufacturing a formed article of a composite material, the apparatus comprising:
 a preforming part having a preforming mold which accommodates a material comprising thermoplastic resin material and fabric material with a flexible release sheet being arranged between said material and the preforming mold, and a preforming means which heats and pressurizes said preforming mold which accommodates said material to impregnate said thermoplastic resin material into said fabric material, so that said material is preformed into an impregnated intermediate material;
 a transport part which takes out said impregnated intermediate material from said preforming mold in a heated state with said release sheet left attached thereto, and transports it to a forming mold;
 a peeling means which peels said release sheet from the impregnated intermediate material in the heated state during said transport; and
 a forming part having said forming mold, which forming mold accommodates said transported impregnated intermediate material in the heated state and without said release sheet, and having a forming means which forms said impregnated intermediate material into the formed article of the composite material by pressurizing said forming mold which accommodates said impregnated intermediate material, the formed article of the composite material being a fiber-reinforced composite material.

14. An apparatus for manufacturing the formed article according to claim 13, wherein, said preforming part is provided with an upper preforming mold and a lower preforming mold as said preforming mold, and is provided with a gap adjusting part for adjusting a gap between said upper preforming mold and said lower preforming mold.

15. An apparatus for manufacturing the formed article according to claim 13, wherein, said preforming part comprises a cooling means for cooling a portion of said preforming mold which is in contact with said material at least at a portion thereof where said release sheet is not arranged.

16. An apparatus for manufacturing the formed article according to claim 13, wherein, said preforming part comprises a separating means to separate a portion of said preforming mold which in contact with said material at least at a portion thereof where said release sheet is not arranged from said preformed impregnated intermediate material.

17. An apparatus for manufacturing the formed article according to claim 13, wherein, said transport part comprises said peeling means.

18. An apparatus for manufacturing the formed article according to claim 13, further comprising a heating press to heat said forming mold, and a cooling press to cool said forming mold.

* * * * *